United States Patent [19]

Ross et al.

[11] Patent Number: 5,712,830
[45] Date of Patent: Jan. 27, 1998

[54] ACOUSTICALLY MONITORED SHOPPER TRAFFIC SURVEILLANCE AND SECURITY SYSTEM FOR SHOPPING MALLS AND RETAIL SPACE

[75] Inventors: Paul C. Ross, Morris Plains; Alex Kononov, Bridgewater; William Wayne Plumlee, Andover, all of N.J.

[73] Assignee: Lucent Technologies Inc., Murray Hill, N.J.

[21] Appl. No.: 580,219

[22] Filed: Dec. 28, 1995

Related U.S. Application Data

[63] Continuation-in-part of Ser. No. 108,268, Aug. 19, 1993, Pat. No. 5,519,669.

[51] Int. Cl.⁶ ............................................. G01S 15/00
[52] U.S. Cl. ............................. 367/93; 340/541; 902/6
[58] Field of Search ..................... 367/93; 340/541; 348/150; 377/6; 364/516, 517; 902/6; 187/390–392

[56] References Cited

U.S. PATENT DOCUMENTS

| | | | |
|---|---|---|---|
| 4,044,860 | 8/1977 | Kaneko et al. | 187/132 |
| 4,112,419 | 9/1978 | Kinoshita et al. | 367/93 X |
| 4,356,387 | 10/1982 | Tsubota et al. | 377/6 |
| 4,528,679 | 7/1985 | Shahbaz et al. | 377/6 |
| 4,839,631 | 6/1989 | Tsuji | 340/541 |
| 5,043,705 | 8/1991 | Rooz et al. | 340/573 |
| 5,138,638 | 8/1992 | Frey | 377/6 |
| 5,255,301 | 10/1993 | Nakamura et al. | 377/6 |
| 5,305,390 | 4/1994 | Frey et al. | 377/6 X |
| 5,331,312 | 7/1994 | Kudoh | 340/541 |
| 5,519,669 | 5/1996 | Ross et al. | 367/93 |

FOREIGN PATENT DOCUMENTS 1137615  12/1982  Canada.

*Primary Examiner*—Thomas Mullen

[57] ABSTRACT

Acoustic surveillance of objects and human traffic in spatial zones of a shopping mall and associated retail selling space is used to detect shopper traffic movement and from it, traffic data such as: shopper volume, shopper flow, crowding, and also unusual motion such as crowd surges that might connote an emergency situation. The apparatus uses phased arrays of acoustic transducers including arrays oriented in a vertical aspect which enables differentiation of non-shopping young children to arrive at more accurate headcount figures. Several specific types of detected movement defined as abnormal trigger an alert to a remote monitoring station. The alerts are automatically prioritized using rule-based criteria. Enhanced surveillance of the alert site by audio links as well as site alert history information are also provided.

11 Claims, 20 Drawing Sheets

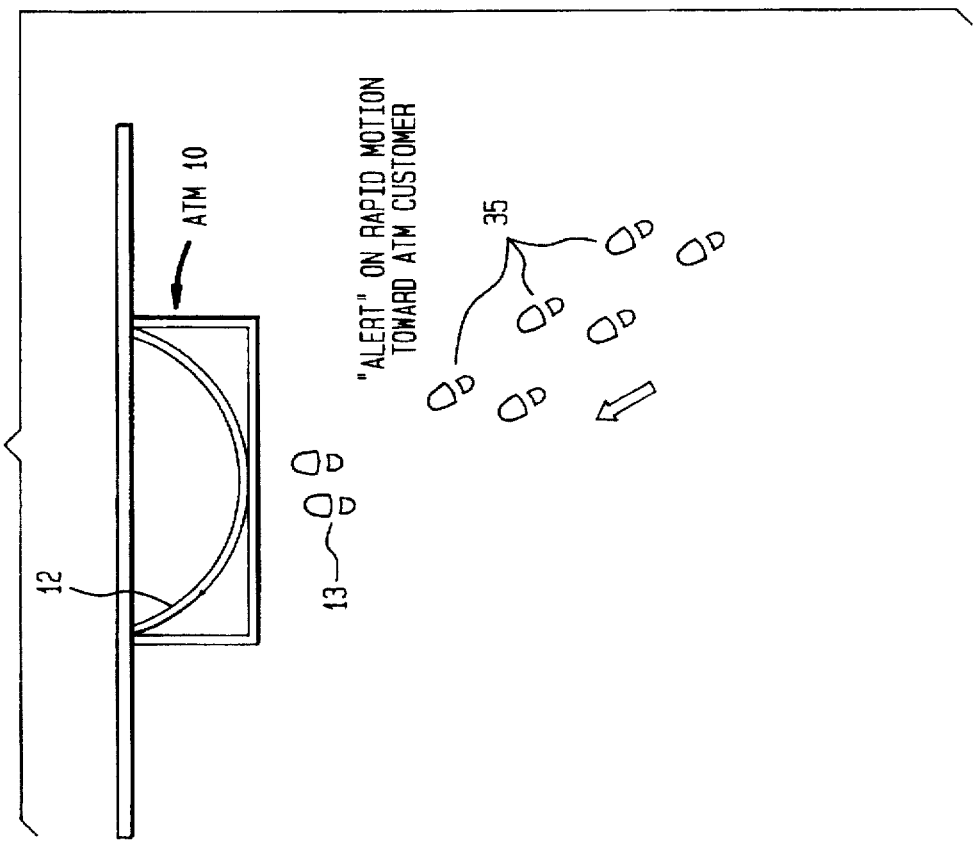
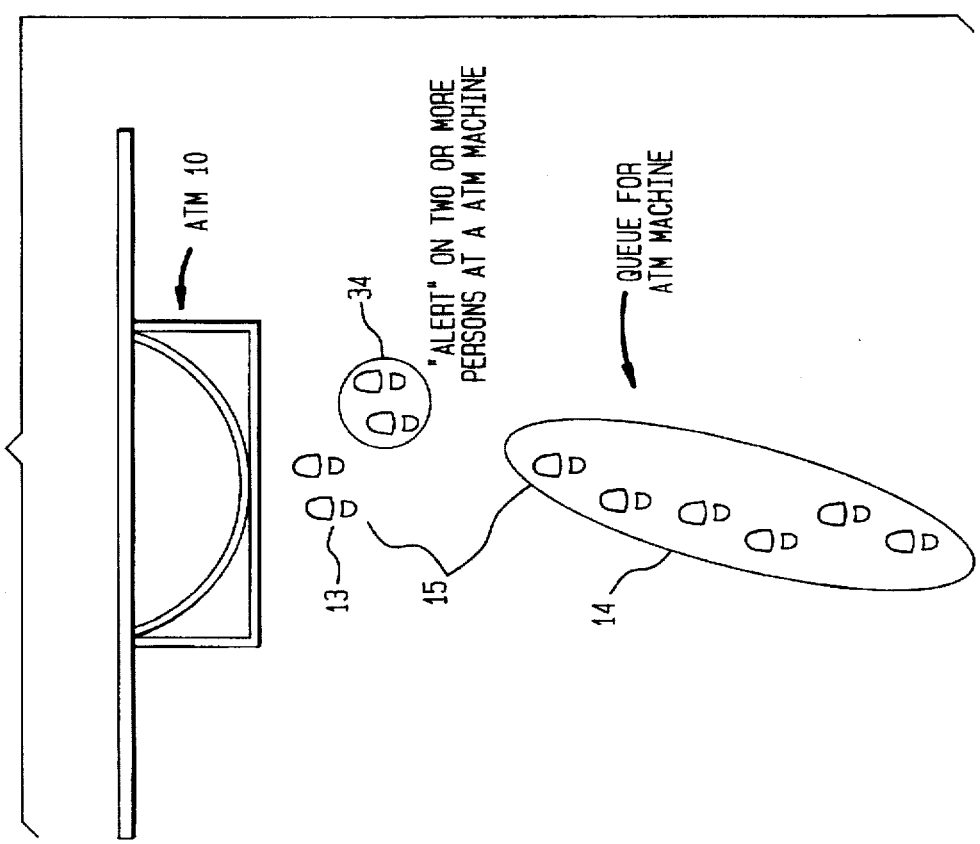

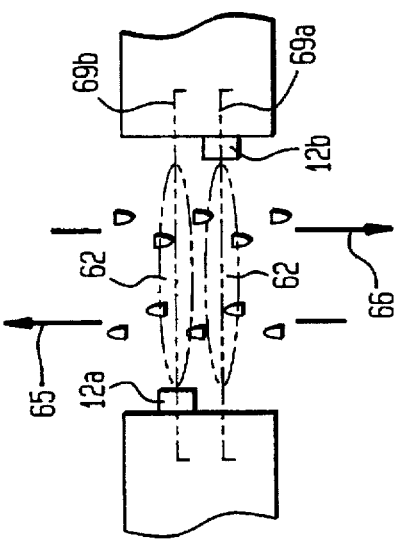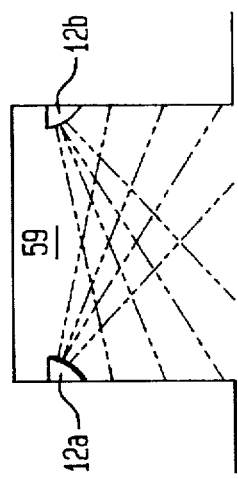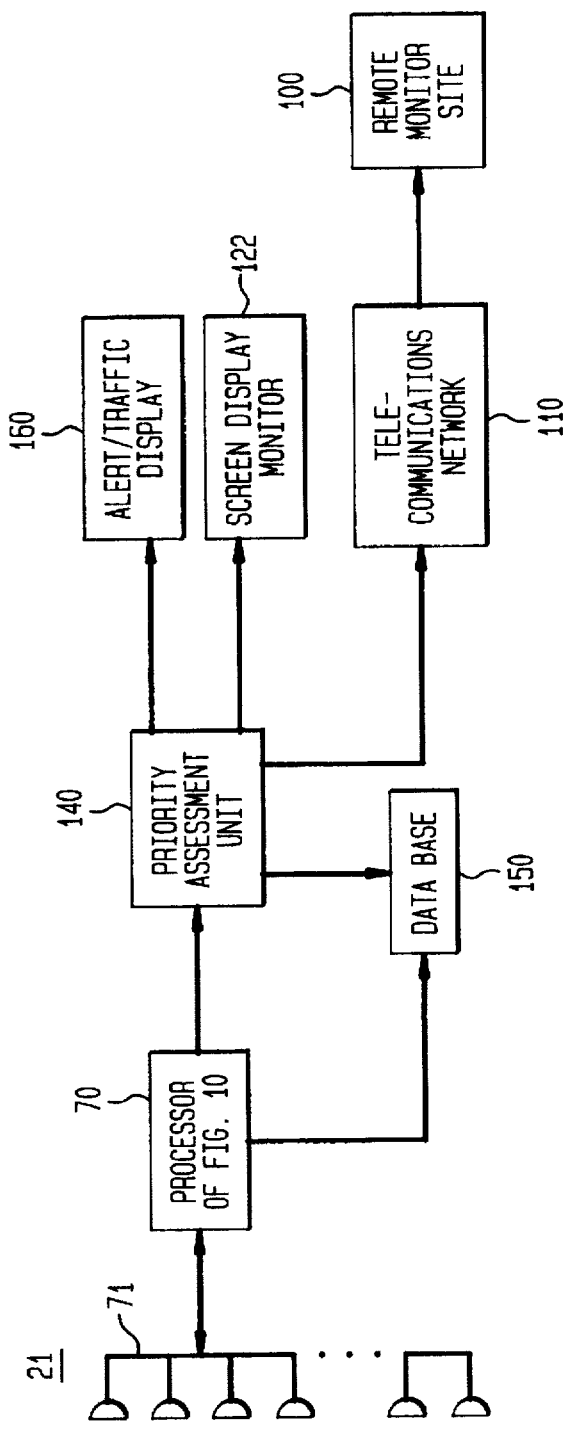

ACOUSTICALLY MONITORED SHOPPER TRAFFIC SURVEILLANCE AND SECURITY SYSTEM FOR SHOPPING MALLS AND RETAIL SPACE

This is a continuation-in-part of Kononov-Plumlee-Ross-Roth patent application Ser. No. 08/108268, filed on Aug. 19, 1993 and issued on May 21, 1996 U.S. Pat. No. 5,519,669.

FIELD OF THE INVENTION

This invention relates to automated remote site surveillance for ATM and other types of financial transaction devices; and also to surveillance at warehouses, shopping malls, parking lots, small businesses, residential properties and the like. In particular, the invention relates to the application of active acoustic arrays to develop, update and record various types of shopper movement at shopping malls and the like.

BACKGROUND OF THE INVENTION

Currently, security surveillance of unguarded sites for burglary, vandalism or other unlawful activity, or for augmenting protection of guarded sites, usually involves taking video camera images of site activity and transmitting the images to a remote central monitoring point. Detection of an actionable incident or event at the site is left to a human observer, who periodically inspects an array of video displays of multiple sites. Because of fatigue and other factors, the chances of the observer failing to notice an incident are substantial. Further, automated reading of video imagery and signal patterns to provide discrimination among physical objects and their movement is difficult because of the complex and expensive signal processing required to accurately discriminate discrete object movement activity in a video pattern. Also, video bandwidth limitations of voice-grade circuits restrict the information that can be transmitted as video images.

A problem similar to providing surveillance at shopping mall space is that of after-hour security for department store retail floors. Currently, site managers here also rely largely on video monitoring and on-site patrolling, with the attendant drawbacks noted above. But in addition, department store retail managers have a need based on marketing and sales considerations for accurate shopper traffic data such as flow rate, shopper "headcount" and shopper interest in retailing "events" as evidenced by localized low (or zero) traffic flow rates. These data currently are obtained mainly by direct human observation. The need for more accurate and automated traffic data in such establishments is currently not met.

SUMMARY OF THE INVENTION

It has been realized that acoustic surveillance methods and apparatus are uniquely well-adapted to detect suspicious object presence and movement within a limited and discrete area such as an ATM or other financial transaction facility. The acoustic signal patterns emanating from objects and their movement may be spatially processed and the results analyzed in accordance with predetermined rules to distinguish suspicious from routine activity.

The invention contemplates using an active acoustic system to generate a sound signal into a site such as an ATM location, for example. Various characteristics of the return wave form are measured. The measures include a comparison of the return wave form to a predetermined "template" of the site with no movement activity; and comparisons to the earlier return echoes. The measures then are evaluated according to the rules to determine whether a given return wave form is indicative of a suspicious event.

The possible occurrence of a suspicious event is determined by acoustically detecting movement activity which is inconsistent with behavioral norms for the site. These norms are deterministic: one such norm, by way of example, is the zone of privacy habitually afforded by the queue of customers awaiting their turn, in consideration for the privacy of the customer currently transacting business at the ATM. A sudden movement of a physical shape toward the user, or two or more persons present at the machine, are automatically detected by monitoring variations in the acoustic field pattern of the ATM area scanned.

When a defined deviation from the normal is detected, one or more responsive and protective strategies are invoked. An alarm is sent to an attended central monitoring station over connecting telecommunications linkages. Prioritized information on the type of movement is displayed on the attendant screen along with site information including site layout, access roads and alarm history. Once alerted, the attendant may activate a local video monitor to obtain one or more video or/and acoustic information frames for the moments immediately preceding the alarm time. Depending on the event, the system or attendant may shut down or restrict the money-dispensing capability of the ATM.

In accordance one aspect of the invention, return echo signals are received by an acoustic array of multiple pickup receivers mounted on or near to the ATM, and directionally oriented to monitor echoes returning from particular azimuth angles within the beam of the receivers.

In a further realization of the invention, security in department stores and in shopping malls is enhanced by providing an active acoustic system comprising a plurality of transducer arrays to monitor movement in aisle space and at entry points to the secured area. As in the ATM application, abnormal movement—which in this application may be defined as any movement occurring after-hours—is detected; and alert signals are generated.

Placement of multiple active sonar transducers to detect movement in this latter setting, additionally enables the measurement of shopper density, shopper traffic flow at selected points, and shopper interest in, for example, particular displays as evidenced by traffic flow showdown or stoppage at the point of the display.

Still further, by providing a vertical discrimination capability in the active acoustic arrays to measure height of persons passing by a selected entry point, an estimate may be made of the number of small children present; and this estimate my be subtracted from the total shopper count to provide an indication of the number of actual money-spending shoppers in attendance.

The invention and its further aspects, features, and implementations will be more readily appreciated from a reading of the description to follow of an illustrative embodiment.

DESCRIPTION OF THE DRAWING

FIGS. 7 and 8 are top views of the acoustically monitored space in front of the ATM, illustrating alert situations;

FIGS. 21 and 22 are side and top view sketches of an alternate scheme for ascertaining shopper height at an entrance portal to a mall;

FIG. 23 is a block diagram of an acoustic detection, signal processing and display system adapted for shopping mall traffic monitoring.

DETAILED DESCRIPTION OF AN ILLUSTRATIVE EMBODIMENT

Figure 1:
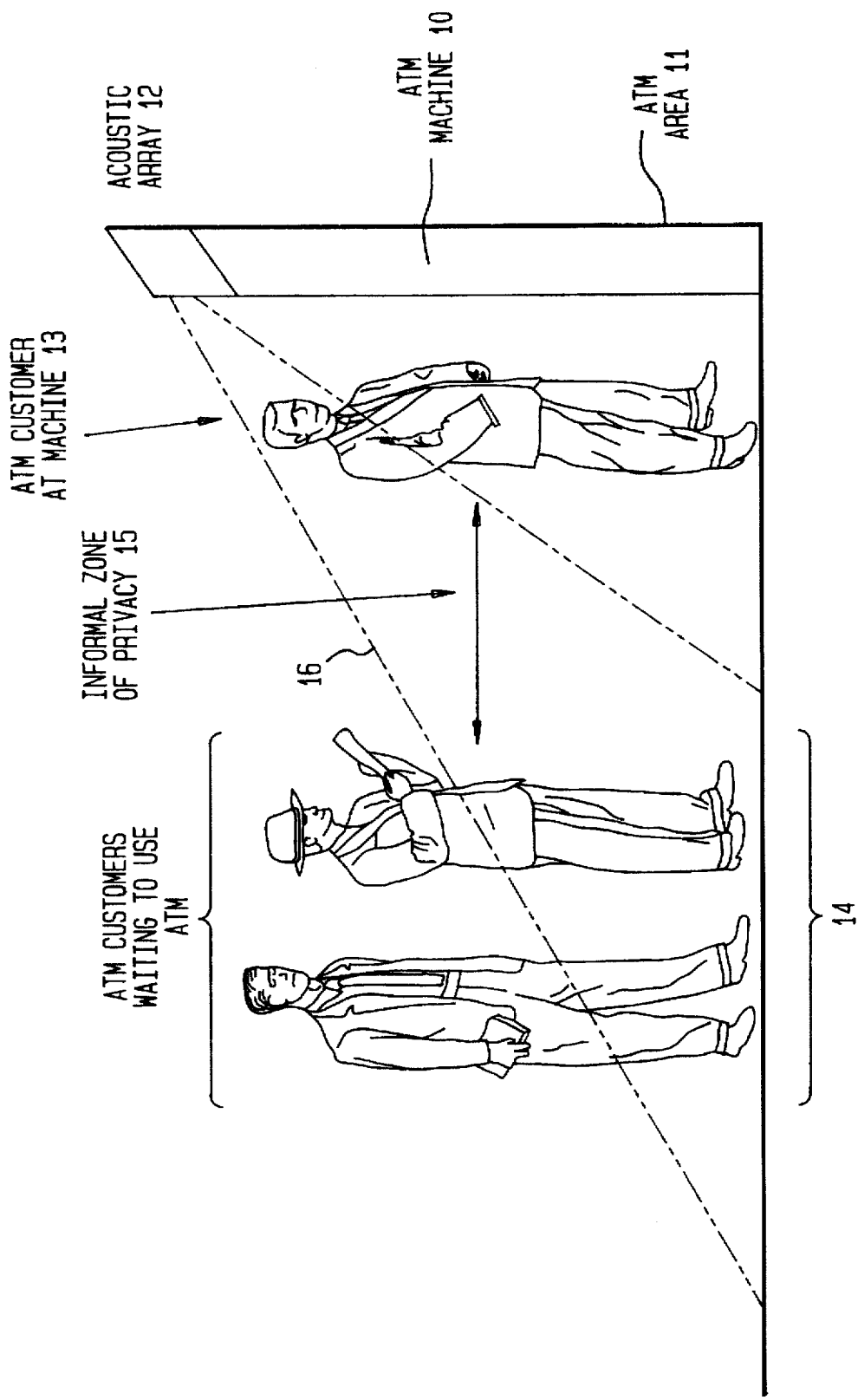
FIG. 1 is a schematic drawing of an active ATM site with user queue.

As seen in FIG. 1, an ATM machine 10 installed in an ATM area or enclosure 11 (spatial zone) is augmented with an active sonar 12 which actively acoustically monitors the area in front of ATM 10 in a manner to be described. Machine 10 is in use by a customer 13; and a line 14 of waiting customers is formed. Persons familiar with ATM usage recognize the "courtesy" space afforded to the current machine user 13 by the queue of customers, providing the current user 13 a zone of privacy denoted 15 in which the user 13 can conduct transactions in relative privacy.

Figure 2:
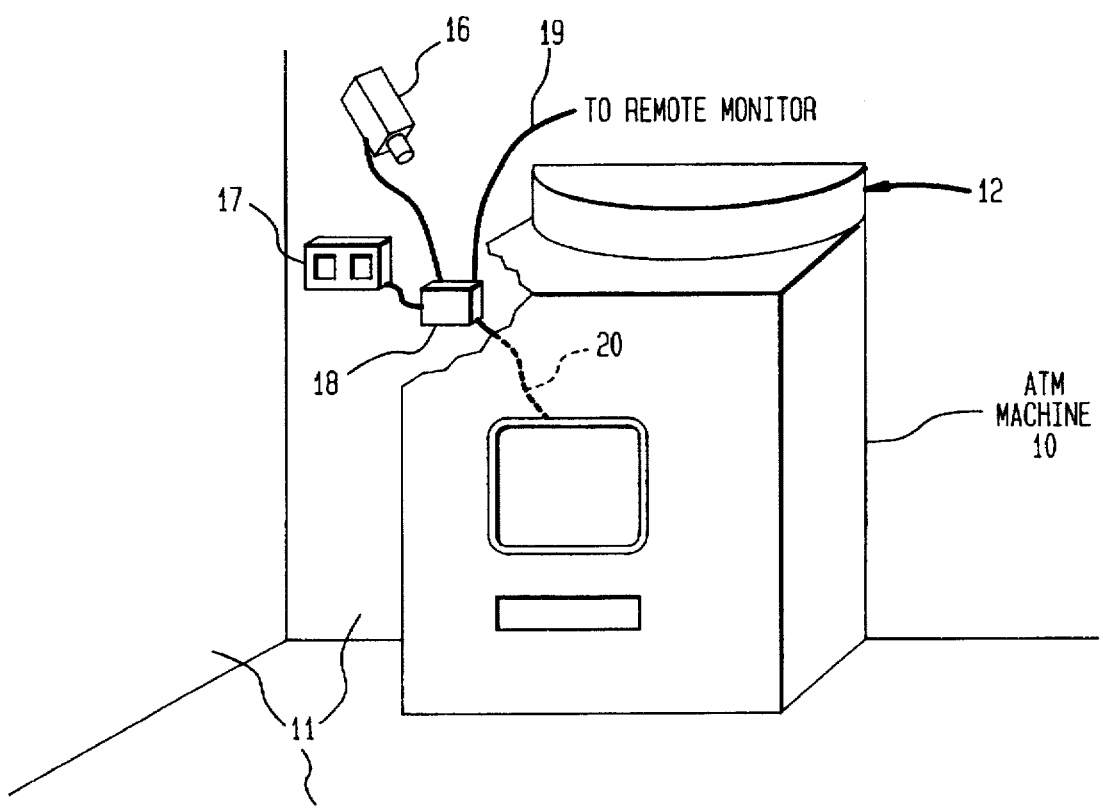
FIG. 2 is an isometric diagram of an ATM machine augmented with an active acoustic array.

FIG. 2 shows an active sonar 12 mounted on top of machine 10 to acoustically survey the spatial zone 11 in front of and around the machine. The active sonar 12 may be mounted elsewhere in the ATM spatial zone instead of on the machine 10 itself. FIG. 2 also shows a video camera 16 and an audio transceiver 17 mounted in spatial zone 11. A local controller 18 mounted internal to machine 10 provides communications control between camera 16 and transceiver 17 to a remote monitoring site through a network connection 19. Certain functionalities of the ATM itself may, in accordance with the invention, also be linked to controller 18 through connection 20, and controlled remotely in a manner to be described.

Figure 3:
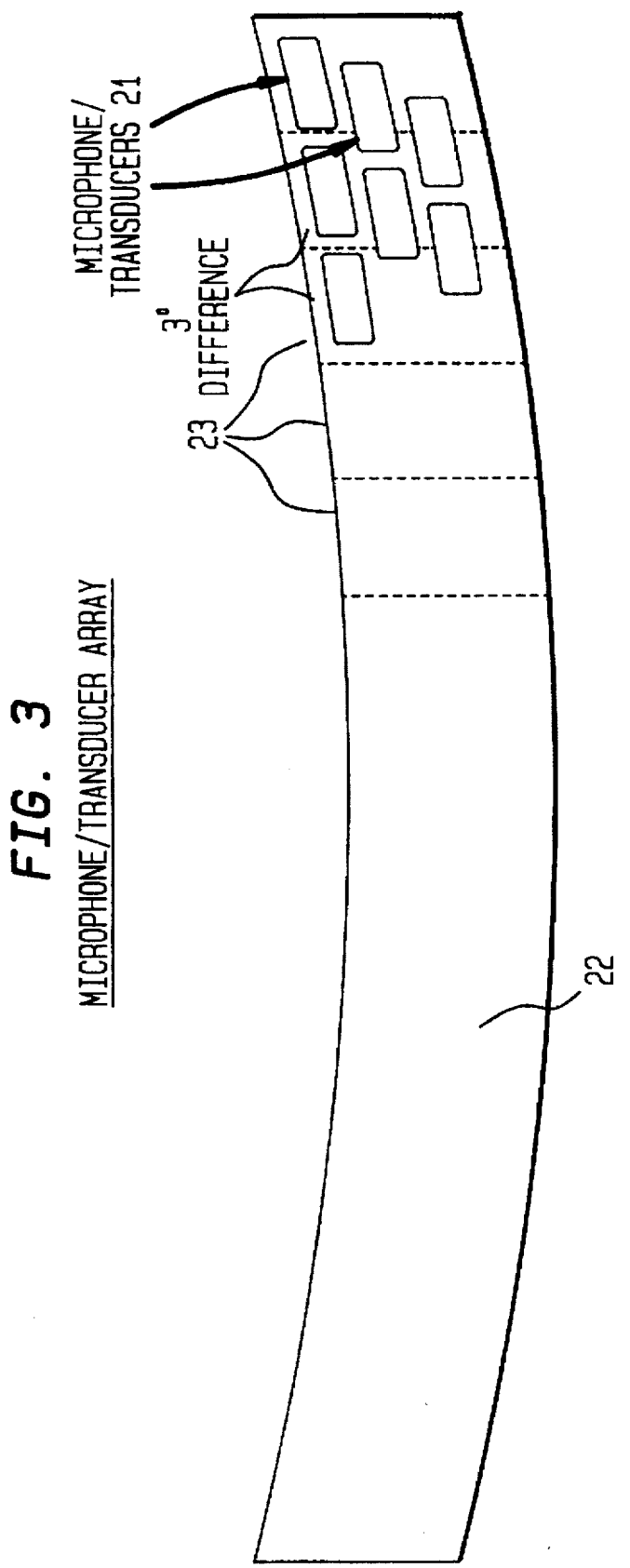
FIG. 3 is a detailed schematic diagram of directional mounted microphone arrays for detecting return acoustic echoes of an active acoustic pulse.
Figure 5:
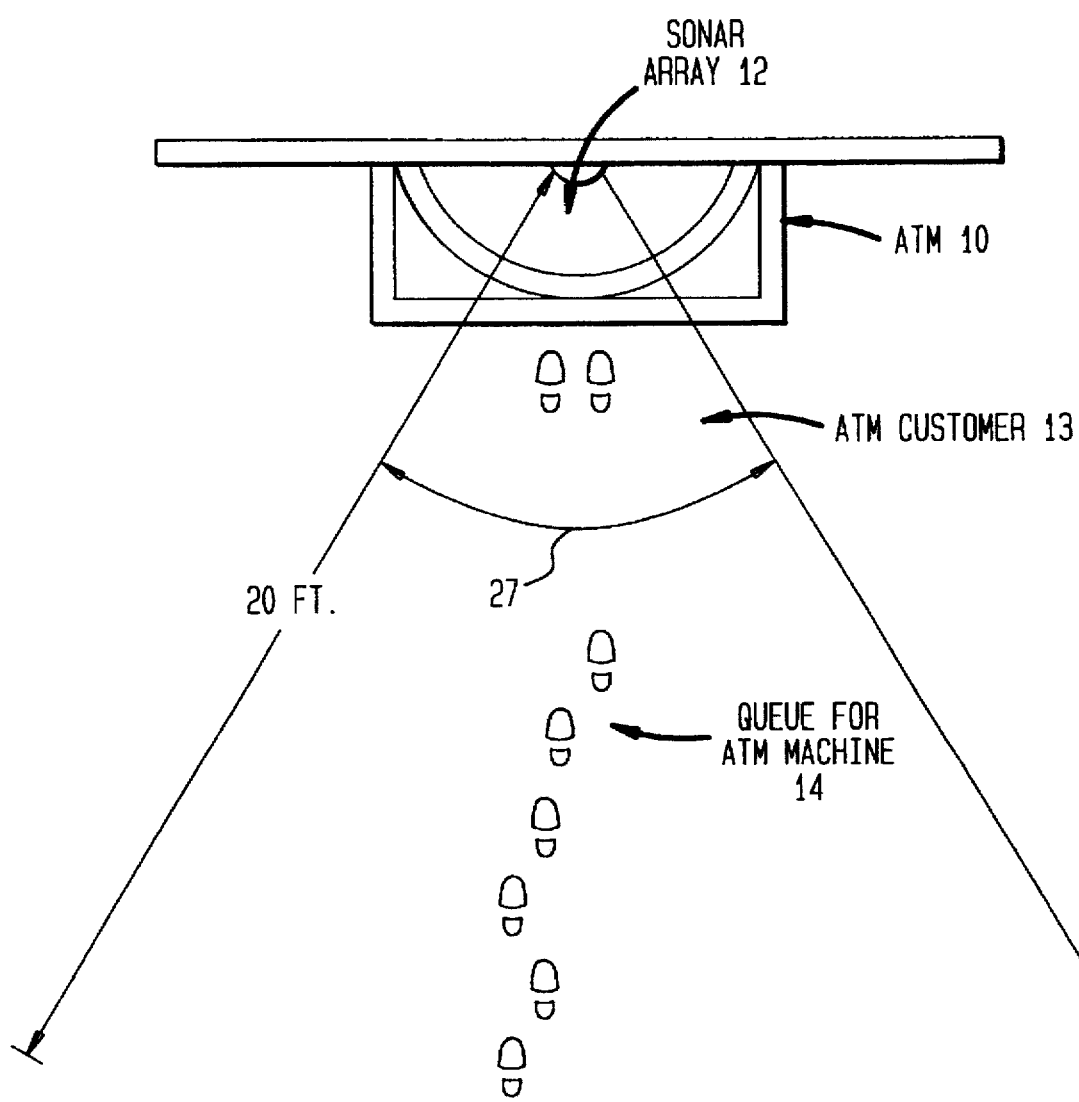
FIG. 5 is a top view diagram of the acoustically monitored field in front of the microphone array, showing an exemplary customer queue.

FIG. 3 shows a specific version of active sonar 12 as consisting of an array of directional microphone/transducers 21 each generating bursts of sound or "pings," and each functioning as a microphone to receive return echoes from the pings. Microphone mount 22 is shaped to orient individual transducers to cover the space of the spatial zone 11 at 3 degree horizontal azimuth angle intervals, subtending about 120 (or more as necessary) horizontal degrees and 20 vertical degrees as measured from the horizontal. The 3 degree directional intervals may be achieved by providing a succession of flat surfaces 23 on mount 22 which differ in their horizontal orientation by 3 degrees. As seen in FIG. 5, the horizontal orientation of active sonar 12 enables physical objects in front of machine 10 including machine-using customer 13 and the queue of customers 14 to be acoustically detected by the microphones of the transducers 21 that make up the horizontal angle denoted 27.

Figure 4:
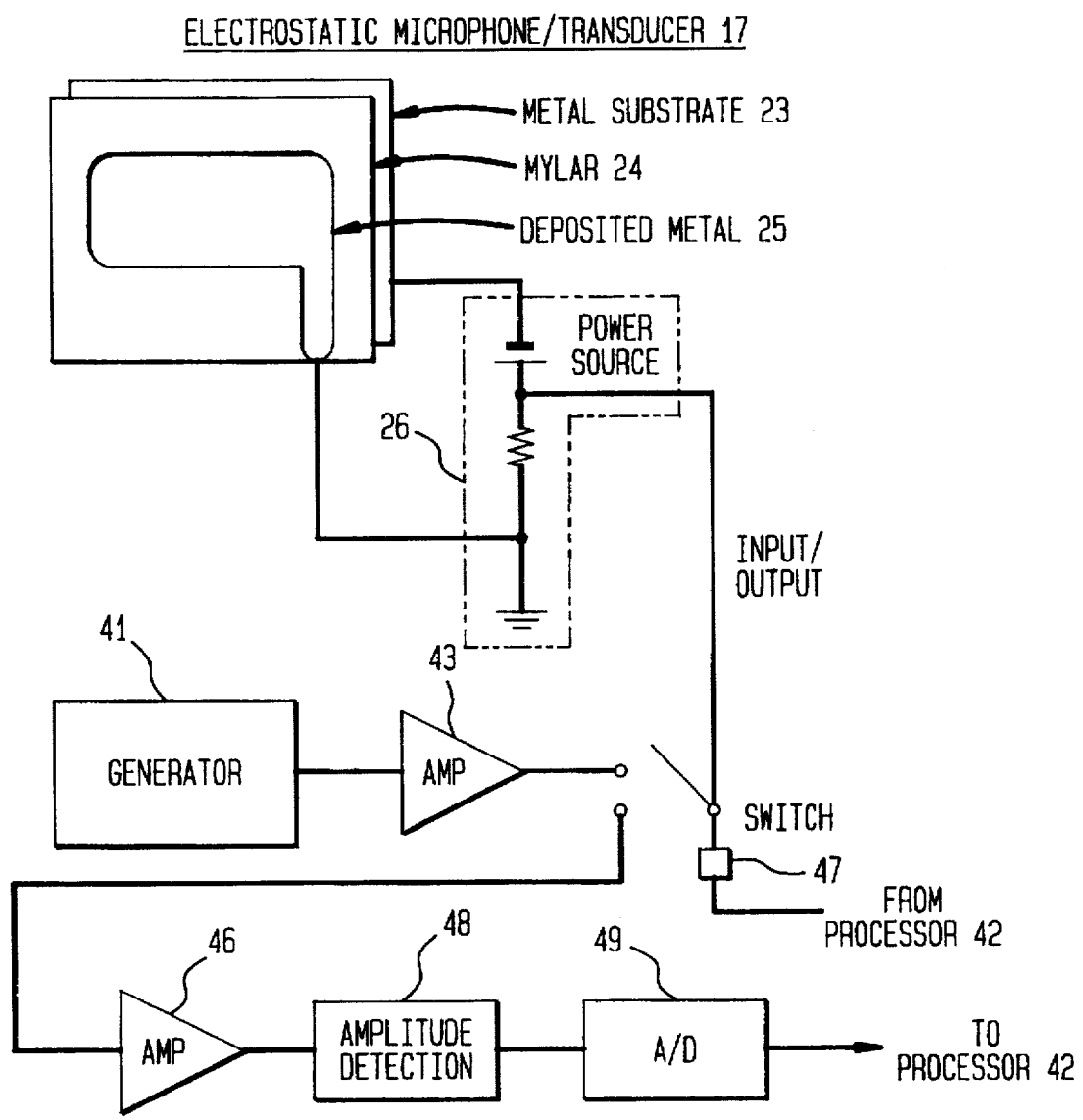
FIG. 4 is a schematic circuit diagram of an electrostatic microphone/transducer used in the array.

The transducer 21 may be of the electrostatic type shown in FIG. 4, consisting of a metal substrate 23, a MYLAR layer 24, a deposited metal coat 25, and a power supply circuit 26.

Figure 6:
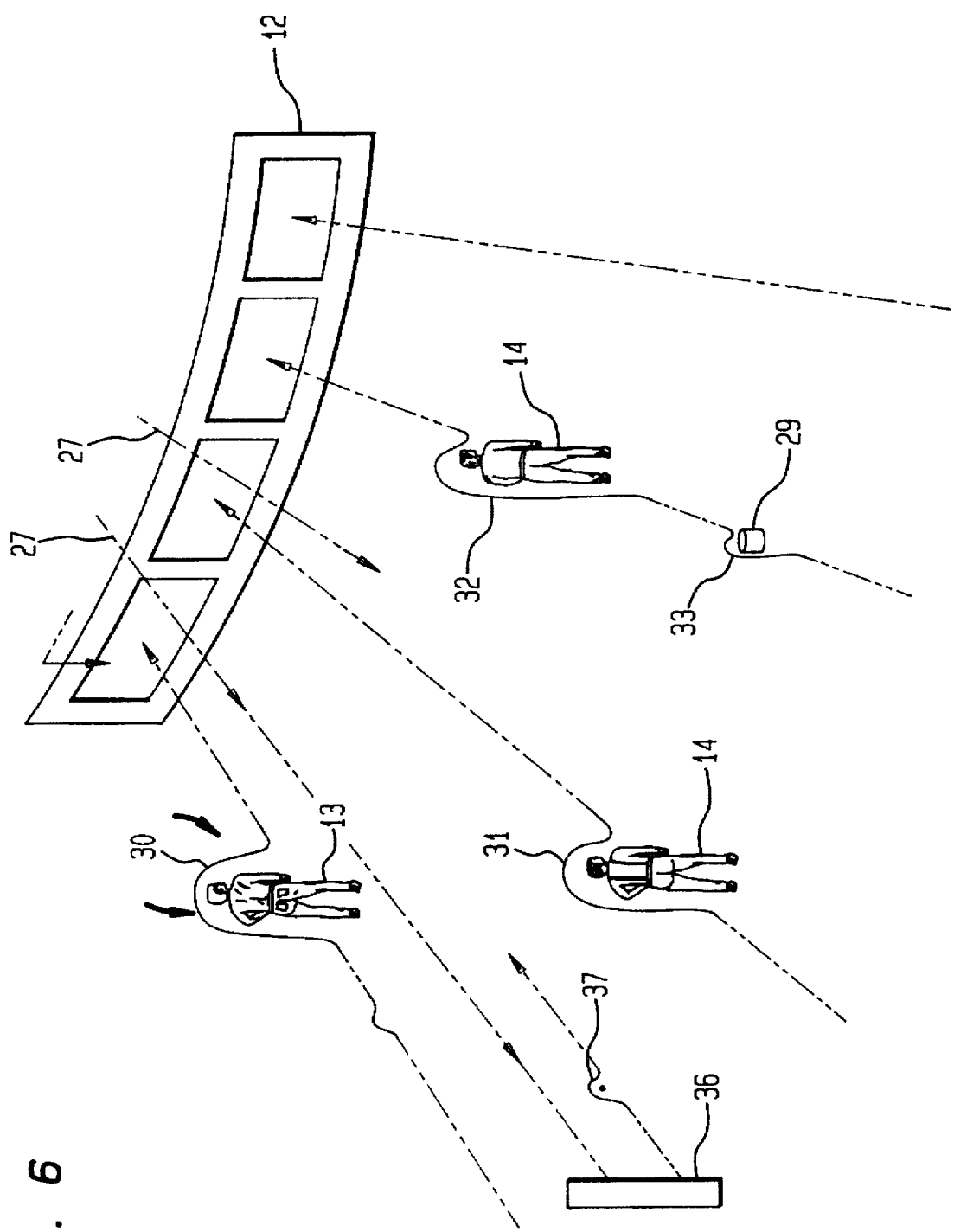
FIG. 6 is a more detailed isometric drawing illustrating the field of coverage of the array.

The continuous acoustic surveillance of area 11 illustrated in FIG. 6. The active sonar 12 sends out "pings" denoted 27, which encounter objects denoted 13, 14, 29 from which echoes 30, 31, 32, 33 are returned. The echoes returning from various known directions are pattern information that enables signal processing equipment, to be described below, to detect a wide variety of physical activity. For example, the event depicted in FIG. 7, where 2 or more persons are positioned in front of machine 12, is one type of acoustically detectable event which is defined as actionable activity. Here, the entity 34 may be a person who has intruded on the zone of privacy 15 of customer 13. The event illustrated in FIG. 8 consists of rapid movement of an entity as denoted the footstep path 35 from the far acoustic field to or toward the ATM-using customer 13. The very onset of any rapid movement within the purview of array 12 exemplified by the preceding can be detected as signal amplitudes representing return echoes; and is an event that triggers an alarm.

Further in accordance with the invention, a "negative" acoustic return echo may also signify the occurrence of an actionable event. To illustrate, referring to FIGS. 6 and 9, ATM machine area 10 includes a window 36 or other closure. One of the microphone/transducers 21 is permanently pointed at the window 36; and a normal echo 37 signal is returned by the window as an electrical signal received in time. If window 36 is disturbed by opening or breaking, the electrical signal 37 is substantially reduced in amplitude, which registers as a relatively negative signal in the same time slot.

Figure 9:
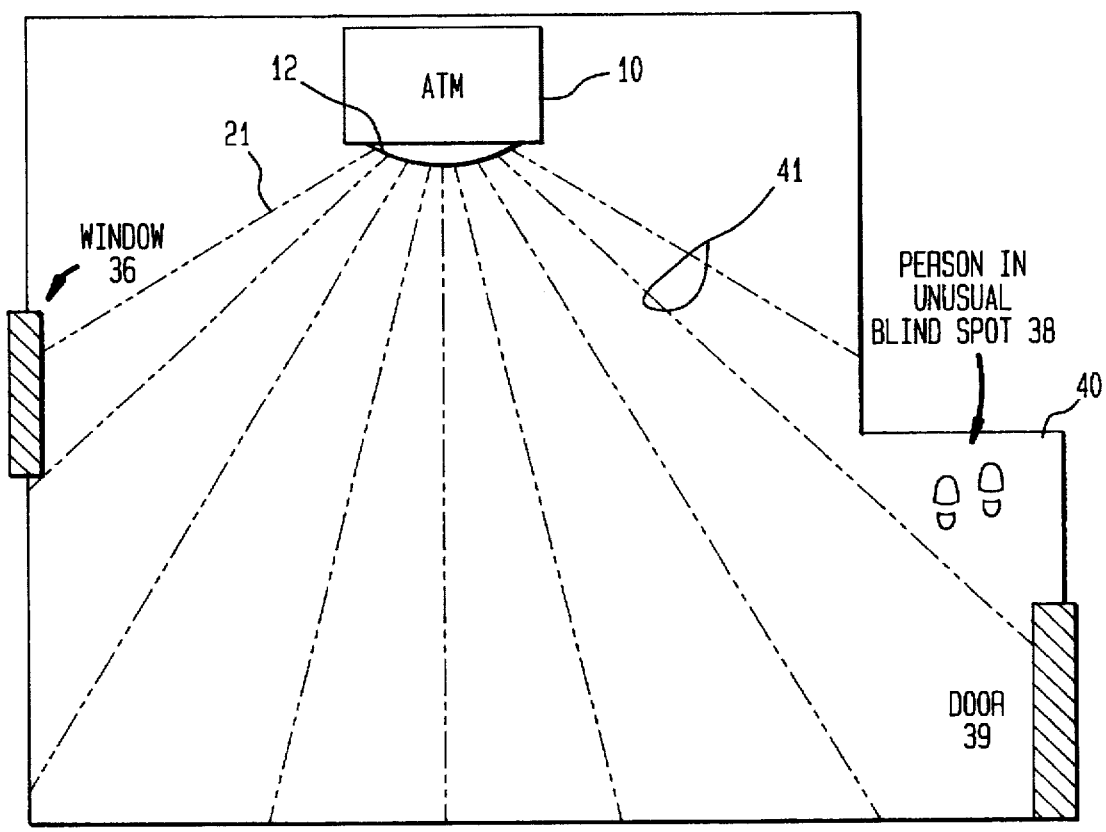
FIG. 9 is a top view sketch of an ATM site illustrating the invention's ability to discriminate events based on negative acoustic indicia.

Similarly, referring still to FIG. 9, a person 38 may enter the machine area 11 through an access door 39 and locate in a place such as 40 that is not directly accessible by the pinging signals 41 or by video camera 16. The original entry of person 38 through door 39 registers as a positive echo signal; but the subsequent disappearance of person 38 as a now negative echo signal is also detected. Taking the two events together, it may be concluded that the person has occupied the blind space 40. Over a long enough time this condition is taken as indication of a lurking intruder; and an alert is automatically triggered. Detection of a lurking intruder in a blind spot may also be registered from monitoring the reflected energy from the relevant search beam and nearby beams, to look for change in the reverberant field of that sector.

The acoustic signal generation, detection and data processing which permits the critical discrimination between normal vs. suspicious events will now be further described.

Figure 10:
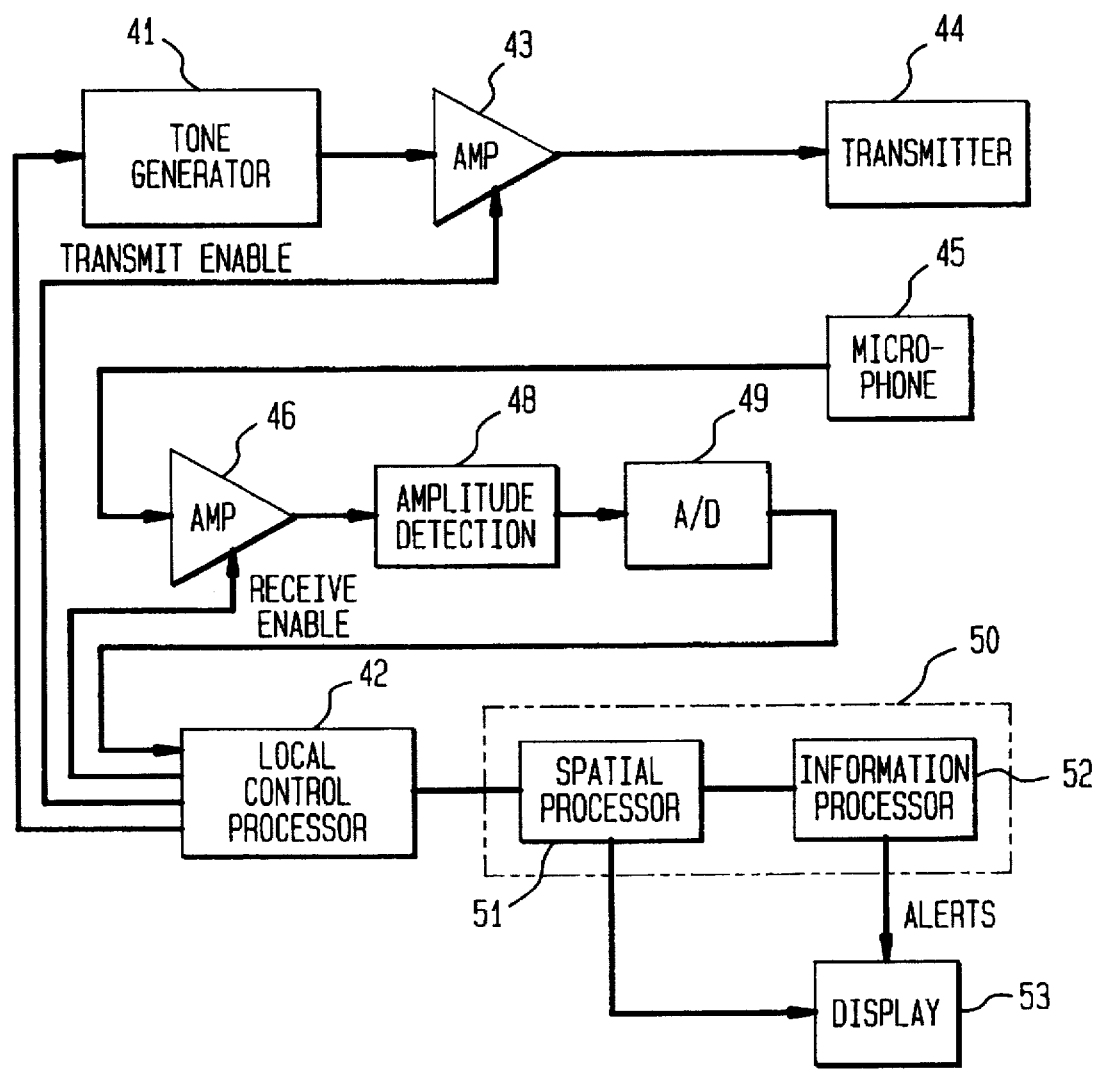
FIG. 10 is a functional block diagram of the electroacoustic circuit.
Figure 15:
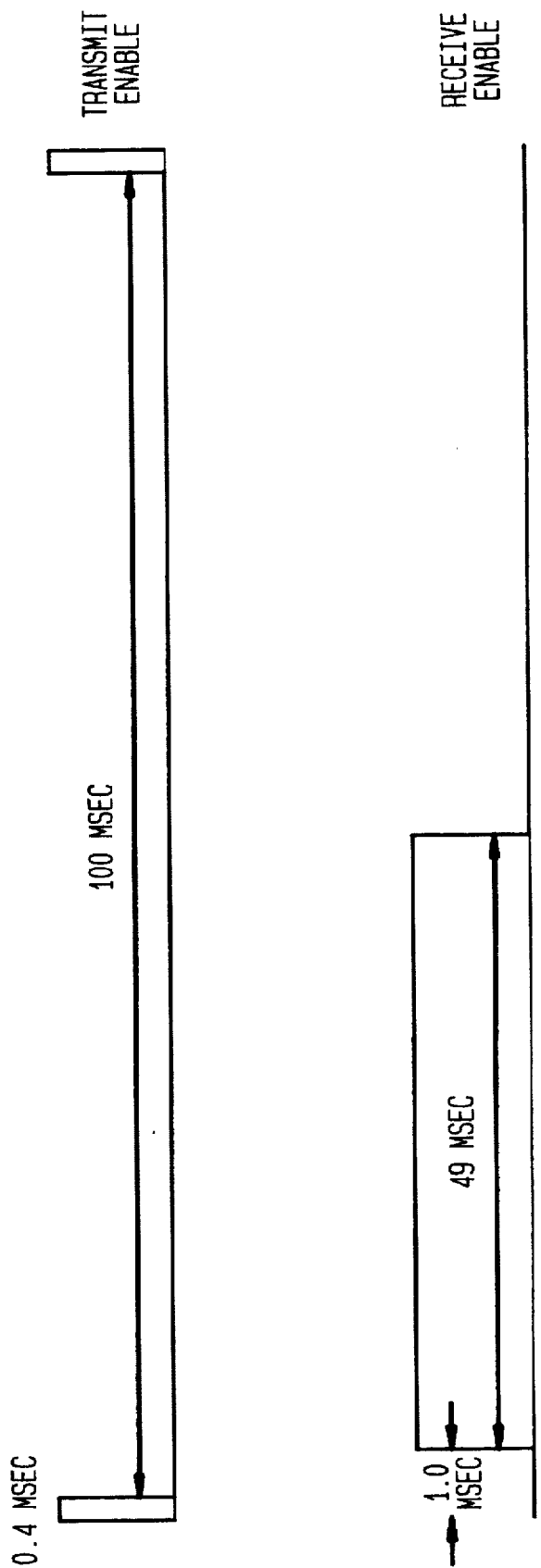
FIG. 15 is a timing diagram.

Referring now to FIGS. 4 and 10, an illustrative hardware configuration is shown for detecting, analyzing, discriminating, displaying and reacting to suspicious movements or disappearances in the area of the ATM. The pulse and detection timing sequence is set to survey objects within about 25 feet of the active sonar 12. An operating cycle for the system, shown in FIG. 15, consists of transmission of an acoustic energy pulse for a period of 0.4 msec., a wait period of about 0.6 msec. to allow the transmit diaphragm to damp, a receive period of about 49 msec. during which the echo signal energy is detected and analyzed, and finally a silent period during which the system is shut off. Electronic tone generator 41 is triggered by local control/processor 42 to produce a 50 KHz electrical signal. This signal is amplified in amplifier 43 to 10–50 milliwatts and applied to transmitter 44 for a 0.4 msec. period. The resulting acoustic pulse is propagated into essentially all of the 3-dimensional space in front the ATM enclosure.

In the receive phase, the echo signals from all objects within the focus of the array are received, essentially as separate packets or envelopes of acoustic energy at the microphones such as microphone 45. Each packet is received at a time that varies directly within the distance to the object from the array. The energy of each packet varies inversely as the square of said distance, but directly in accordance with the relative size of the object. An alternative drive circuit for the active sonar is shown in FIG. 4 where a 1-component transmit/receive transducer is switched between transmit mode and receive mode by switch 47.

The echo signal characteristics are converted to electrical signals, the amplitudes of which are used to build a spatial map, or frame, containing all objects in front of the ATM. A sequence of these frames are analyzed to identify alerts. Specifically, the received echo signals are amplified in amplifier 46 and fed to a detector 48 which recognizes discrete amplitude bursts above a set threshold. This threshold may, for example, comprise a quiescent state "template" of the fixed or invariant echo characteristics of the enclosure. The template may be generated by analyzing the echoes created in response to one or a succession of pings launched at a time when human activity at the site is not occurring, such as when the facility is closed down. The quiescent condition template information is then subtracted from all frames to concentrate frame-to-frame analysis upon signal energy which is caused by objects occupying or moving within the ATM area.

If objects such as humans are in the purview of the active sonar 12, the objects will be manifested as energy envelopes or bursts which remain after the template detail is subtracted out. These bursts are then digitized in A/D converter 49. Advantageously, converter 49 has a capacity to handle about 40 channels with a sampling rate of at least 6.4 KHz with 12–16 bit data. Output from A/D converter 49 is sent to local control/processor 42.

One device suitable for performing the functions of processor 42 is an Ariel MP-3210 Dual DSP 3210 ISA card. Spatial processing and information processing functions may be provided by DSP32C or equivalent. Processor 42 also generates transducer transmit and microphone control signals. Processor 42 formats the data into a sequence of samples, which form each successive frame or spatial map. These samples are stored in a local memory in processor 42.

Figure 12:
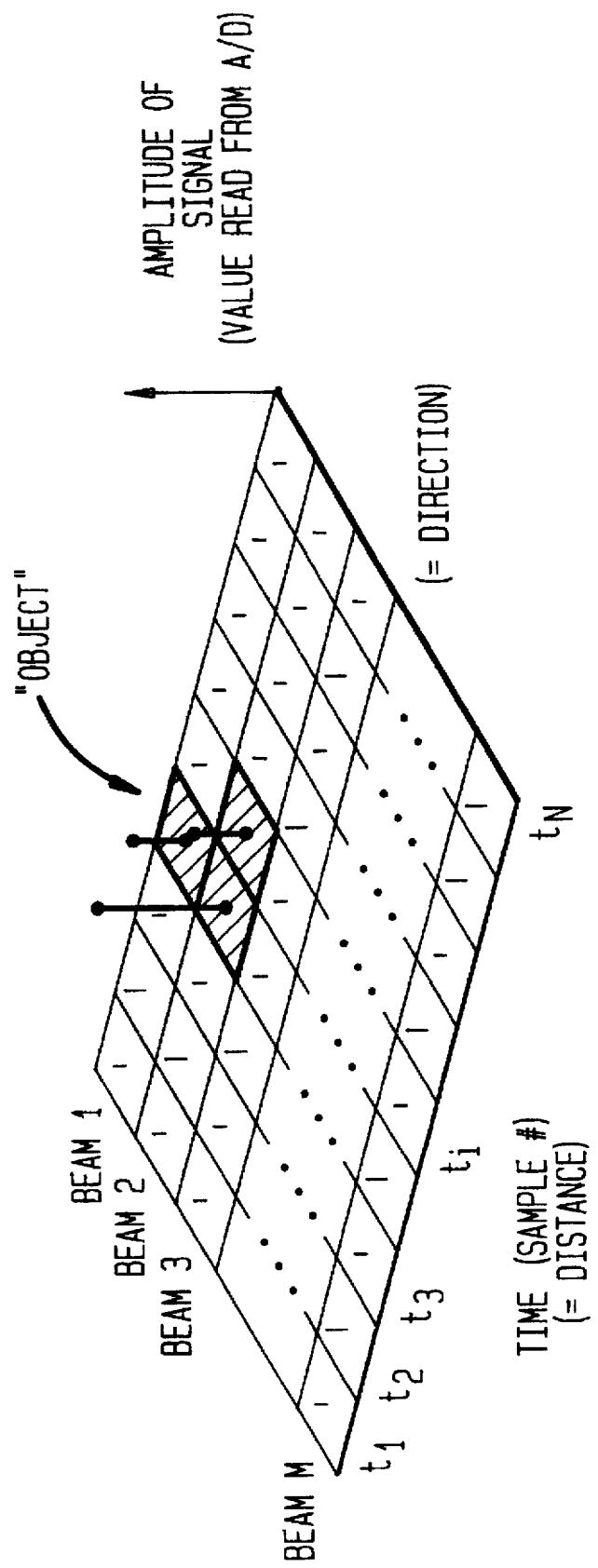
FIG. 12 is a schematic diagram illustrating detection of physical objects in the view of the array.

Data critical to identifying suspicious events now is abstracted from the stored samples by, for example, a separate computation unit 50 which contains spatial processor 51 and information processor 52. Spatial processor 51 forms for each frame a 2-dimensional image of objects in the beam area covered by each directional microphone. The image data includes relative direction, distance of the image from the transmit/receive apparatus on the ATM, and amplitude, the latter being a measure of the image size. As illustrated in FIG. 12 which shows sample objects at distance $t_i$ on beams number 1 and 2, object location with respect to each microphone 45 is a function of beam number and delay. Size and other attributes of the object are represented in the amplitude magnitude. Comparison of successive frames of data provide indicia of the velocity of a moving object. These data are fed to information processor 52 which converts the data of the image samples to indicia of location of moving objects, their relative movement with respect to each other, and other measures.

Figure 11:
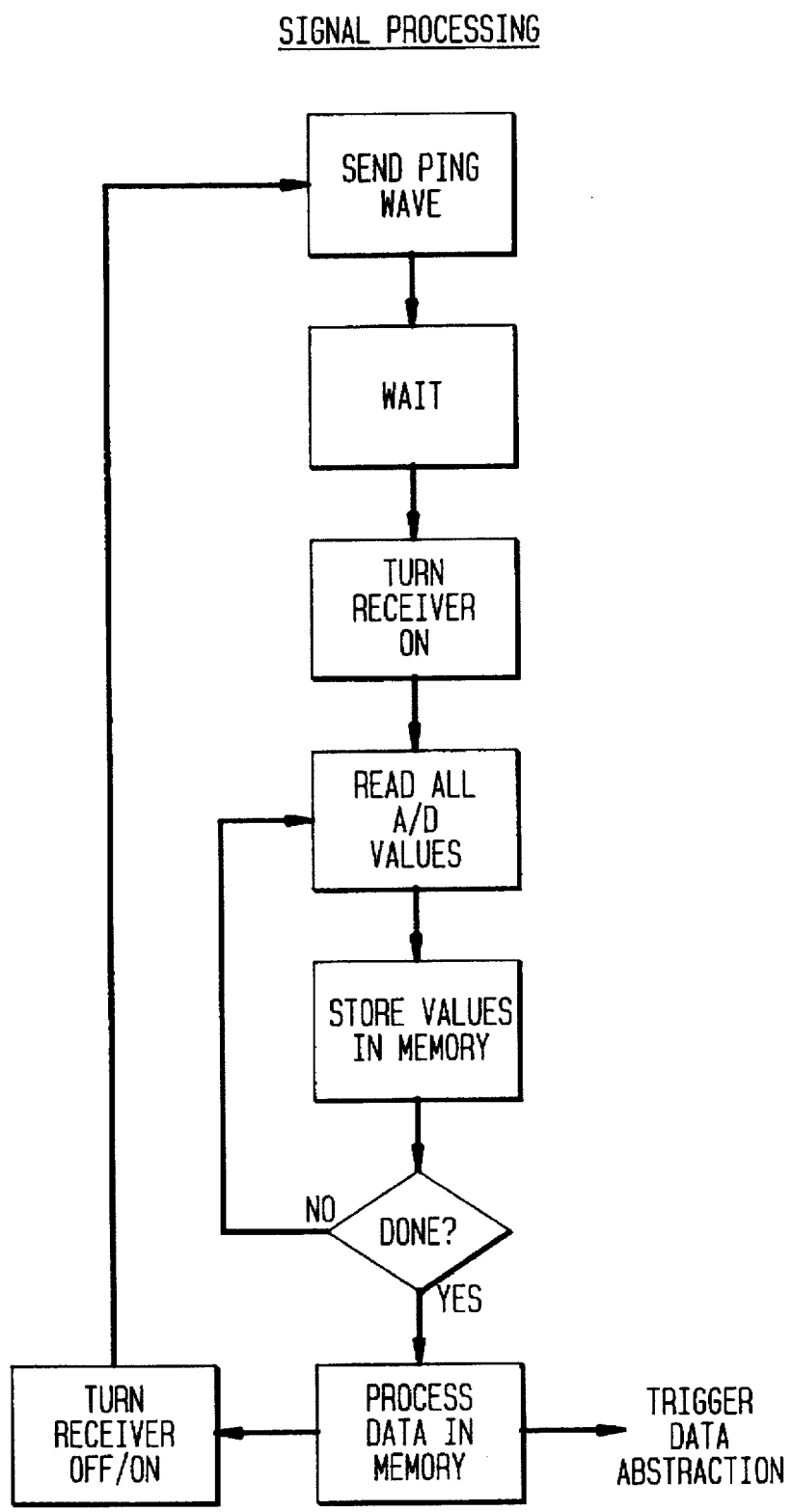
FIG. 11 is a flow chart of the signal processing of the FIG. 10 apparatus.
Figure 13:
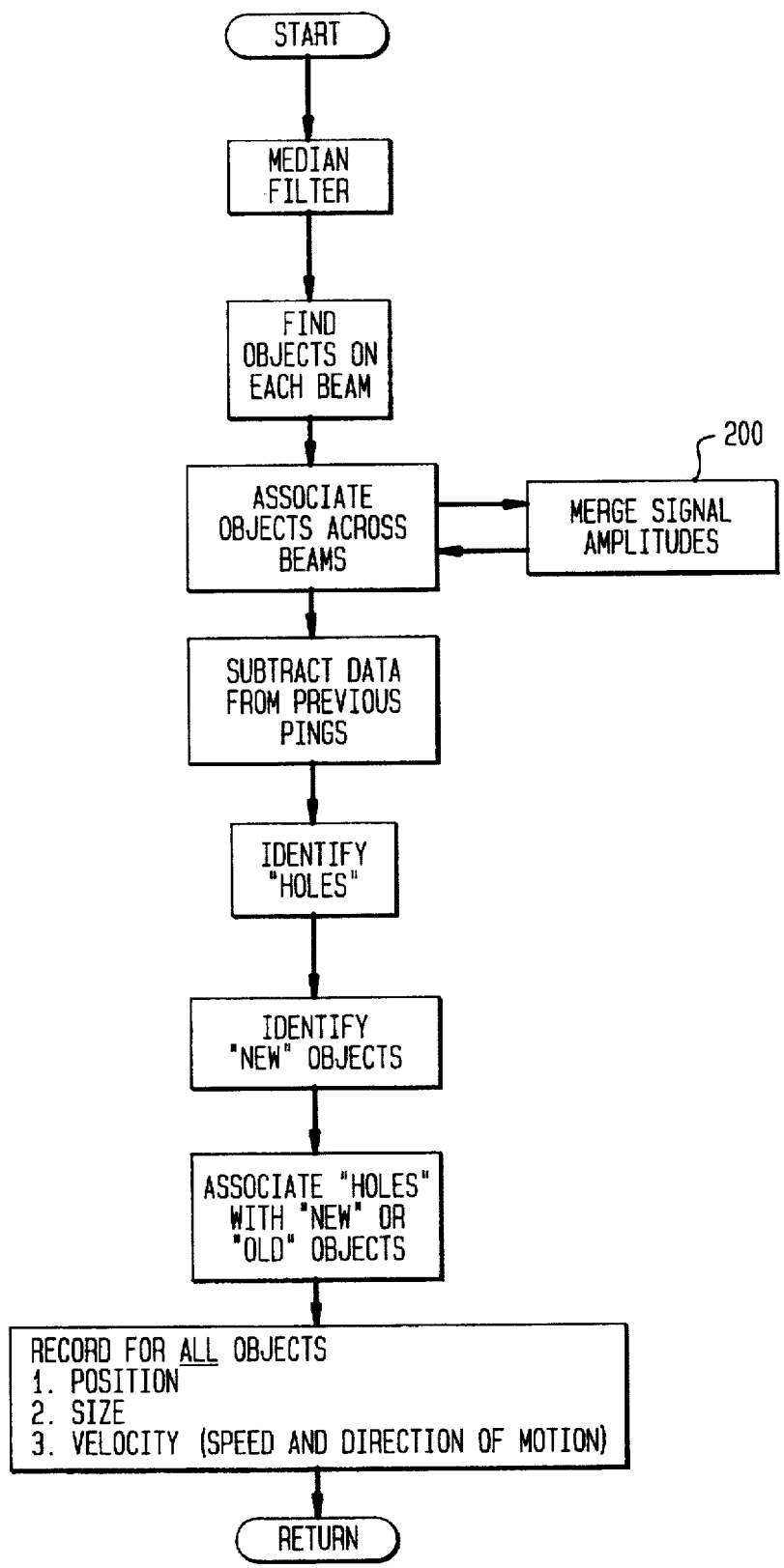
FIG. 13 is a further flow chart describing signal processing for data abstraction to achieve discrimination.

The steps for the above-described signal processing are further outlined in the process flow chart of FIG. 11. An envelope of return echo signal energy is received by each of the microphones 45. Each envelope is measured individually and a digital reading for each is created and stored. Data is collected long enough to assure that the "ping" wave travels to the most remote reach of the spatial zone 11; and any echo has traveled back to the microphones 45. The number of samples taken advantageously corresponds to a time interval of about 50 msec between reads, in order to generate and analyze data in near-real time for fast alerting of abnormal events. When this time is reached, a "completed" decision is effected, which triggers the data abstraction analysis in accordance with the process flow chart of FIG. 13.

The nature of the acoustic data collected and the relative ease of its analysis is a strength of the invention, because of the precise directionality afforded by the active sonar 12, and the fact that return signal amplitudes and the times of receipt provide highly reliable data on which to base useful events analysis. The raw data is filtered to remove noise and reverberation characteristics (the "template" referred to earlier) of the enclosure. New objects, new "holes" and object/"hole" movement are identified.

Referring back to FIG. 12, the separate digitized signal amplitudes exceeding the threshold are equalized. The spatial processing may be enhanced by merging the equalized signals in adjacent beams which are at or about the same distance from the array. For example, 1 and 2 are shown to have detected objects clustered in adjacent cells of the array. These object pulses are merged into a single pulse because they are likely to emanate from a single discrete object. The distance to each identified object is determined by the beam whose merged signal (maximum amplitude) is deemed most reliable. The merging step helps discriminate objects in the present instant by correlating them to the same objects of previous scans. The size of the object defined by merged signals may be estimated more closely by determining the number of beams the object is detected on.

To determine movement in time, an updated spatial representation of the scene is formed. Each collected frame of data is subtracted from the preceding frame of data. A "hole" is signified by the absence of a return pulse in the present frame where in the previous frame or frames one was present at a given matrix point. Objects that appear on the scene are detected as positive peaks; and objects that disappear are detected by noting negative energy peaks or "holes." The updated spatial data identifies any newly-arrived or newly-moving objects as signified by the presence of an echo at the given matrix point where previously an echo did not exist.

The tracing of movement is a matter of logically tracking the path of "holes" and "peaks" movement over the scanned matrix. If a "hole" has moved to a contiguous cell in unison with the movement of an adjacent positive peak, it is interpreted as a movement of the object from a "hole" to a peak.

Using the information on moving objects identified by the data abstraction process, several searches and comparisons are then performed to determine if an alarm situation should be signaled. A normal transaction is the case of a single object tracked in an approach to the ATM machine, which remains close to the ATM for a limited time period to allow transaction completion. This event is declared or labeled a routine "customer" activity. However, movements connoting alarm situations include: (1) two or more objects which simultaneously approach the ATM machine; (2) a single identified object which approaches the ATM machine but does not use it by the end of some predetermined period of time; (3) a previously labeled customer that is still in front of the ATM machine after the predetermined allowed period; and (4) any object that approaches a previously identified routine user no matter what the user's location may be.

Additionally, a sudden disappearance of a return pulse in a beam that is directed, for example, to a window, a counter, or a door of the enclosure, is by definition an alarm. A further alarm condition is the disappearance of a previously identified moving object signaled by the appearance of a "hole." This condition might signify presence of a person lurking out of the acoustic beam's reach under unexplained circumstances.

A further alarm condition may be the lack of movement over some long time interval of a previously moving object, which could signify, for example, a person who had crouched under an ATM service counter if present in the enclosure. Many other alarm conditions beyond these examples will occur to persons skilled in the art, which the spatial analysis of the invention can detect.

The invention as so far illustrated may be usefully integrated into a remote monitoring system for one or several financial transaction devices. While a variety of specific arrangements may be envisioned, an exemplary such system with its particular attributes is described in FIG. 14.

One or more ATM machines 10 each served by an active sonar 12 are located at ATM site 90. The data processing and abstraction capability described heretofore may be located at the ATM site, or may be provided at some location remote from the site 90. Alarm conditions are automatically signaled by local controller 18 to a remote monitoring location 100 through network connections 19 to a telecommunications network 110 which comprises lines of at least voice grade quality.

Condition signals are received at a workstation denoted 120 at the monitoring location. The workstation 120 has an alert screen display 160 served by buffer 122. A communications controller 130 interfaces the workstation to the network 110 through two-way communications lines 111. Controller 130 may include adjuncts (not shown) such as a modem pool and line concentrator to manage incoming and outgoing traffic.

Incoming message priority assessment unit 140 establishes priorities among alarm situations. Its processes are rule-based, addressing factors such as: what type of event as detected by the analyzed data precipitated the alert message; what is the priority of the alert; and given the presently-active alerts, what is the relative urgency of the new alert. These considerations are programmed as rules into the unit 140.

The rules may work as illustrated in the following example. Suppose that several alerts are currently in effect and the attendant at remote location 100 is managing one of these alerts, which is a "rapid approach to ATM user." Now, a new alert is received by the attendant workstation, for which the data abstraction unit has determined that two objects are approaching some other ATM machine. On response to this new input, the alert display 160 presents information signifying "two people at ATM" for this further site. In this case, although the new information is displayed, the workstation priority-setting program does not direct the attendant to interrupt the on-going review and handle the new alert.

If, however, the attendant was reviewing a "two person approach" in progress, and the new alert constituted a "rapid approach" situation, the priority assessment unit 140 interrupts the present review by, for example, opening a window on display 122 accompanied by a tone signal. The window showing the new alert explanation and, if available, a still frame video of the new alert scene.

An on-line database 150 collects information from the output of unit 140, and also has access to site data and history information from site history store 170. The history file includes prior alert instances, and location map information. In response to a specific site alert, the display buffer 122 provides a visual image of the streets and access roads for the ATM site in store 170; and also a plan view of the specific ATM site layout with walls, counters, polls, doors, etc. As new alert information is received for a given site, data on the date and type of event is entered into a permanent file for the site also contained in store 141. This accumulated data bank enables ATM site managers to recognize particular security problems, patterns of ATM robberies and other facts; and react accordingly.

Site history will vary; and for sites which experience relatively more alerts and particularly for those experiencing more actual criminal activity, the system may be set to effect a periodic "page" of such sites. The "page" shows on display 160, for example, in the form of a prompt to the attendant to view a paged video still shot, for example, once every 10 minutes.

When the system registers no alerts at any ATM sites, which is likely to be a great majority of the time, the system provides automatic polling of selected sites. The attendant thus can routinely examine the acoustically-generated object movement data, the video-generated current site still shot, and the available audible activity, as added surveillance capability.

The system also advantageously may contain a two-way continuously open voice link 180 to each ATM location from the remote monitoring station, enabling the attendant to engage in two-way conversation with persons at a site, or to listen-only as needed. The site includes an audio microphone and receiver unit 19 for this function with voice grade circuits 111 linking unit 19 and the site and remote monitoring station 100. Voice link 180 may include a screen switch control for operator use (not shown).

At the ATM sites a video camera denoted 16 in FIG. 2, provides periodic video images. Using video compression and other well-known techniques for transmitting video signals over narrow band telephone lines, a video image may be transmitted to monitoring site 100 at least every 3 seconds. When video is provided in conjunction with the present invention, controller 130 feeds the video information to video frame buffer 121 for referral to display 160 through display buffer 122. In addition to the remote monitoring and response to detected alarm conditions, the system may also generate a visual or audio alert locally, which advantageously may be located so as to be unnoticed by the ATM users, but which enables locally cognizant persons such as a bank security guard to investigate and, if indicated, intervene.

If on reviewing and evaluating alert information, the attendant determines police help is needed, an auto-dialer 190 provides automated voice calling to security patrols or to the local police. Auto-dialer 190 identifies the alerting site, and provides a brief, concise recorded statement describing the alarm condition. An audio statement of the site history file may be included in the automated message. Dialer 190 also records all voice transactions to tape unit 191, supplying time, date and site stamps for the record.

A voice link may also be opened between the site and the security patrol or the police. These further communications capabilities may assist in deterring or thwarting an attempted robbery, and further enable the public to be more comfortable in their use of ATM facilities.

USE OF THE INVENTION IN DEPARTMENT STORE RETAIL SPACE

General Layout

Figure 16:
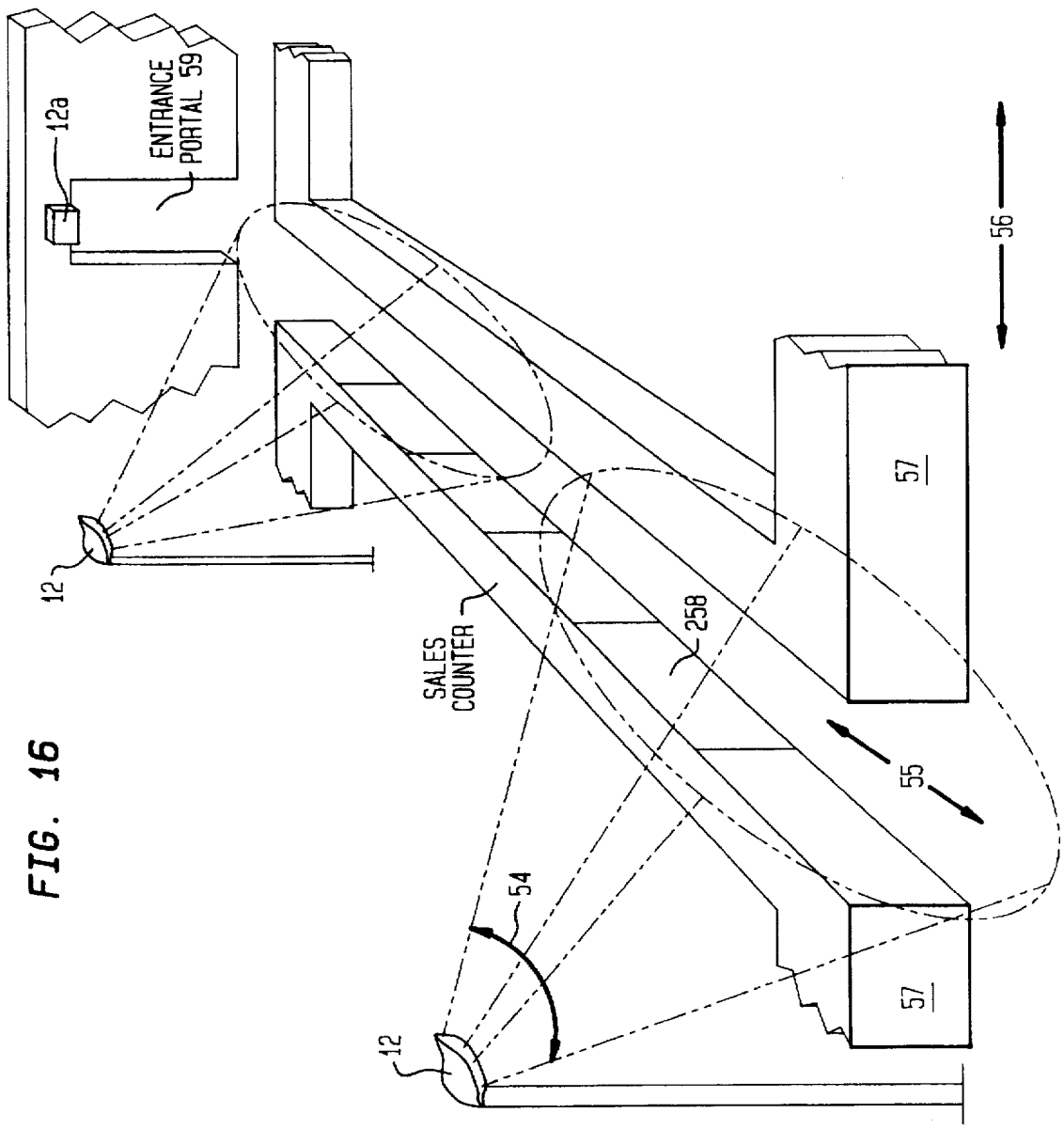
FIG. 16 is a schematic perspective view of the invention applied to traffic monitoring for retail space.

Referring to FIG. 16, security and shopper traffic data monitoring for department stores and shopping malls is provided by the invention, illustratively, by mounting one or more active acoustic sonar units 12 above shopper traffic flow. These provide a measure of vertical aspect of objects which is useful in monitoring shopper traffic.

In the simplest case, a single acoustic sensor is mounted overhead to cover a designated grid area of the shopping area. Alternatively, in accordance with the invention an array of plural acoustic transmitter-sensors form beams with nominal "widths" which in aggregate cover shopping areas larger than a single grid. Both types of sensors may be used to measure traffic and especially height. Because timing of the return echo by a single overhead sensor may be determined with greater accuracy than the accuracy obtainable by resolution of beam width, it may be preferable to take height measurements using overhead sensors.

The example of FIG. 16 uses two active sonar units 12 each mounted on a pedestal 9, which form horizontal beams described below. A single acoustic sensor is mounted as an overhead unit 12a above a portal 59 to provide traffic count and height discrimination. Clusters of units 12a may be suspended from various overhead mounts. By appropriate signal processing of acoustic return echoes similar to those described in connection with microphone transducer array of FIG. 3, useful traffic data is extracted.

Figure 17:
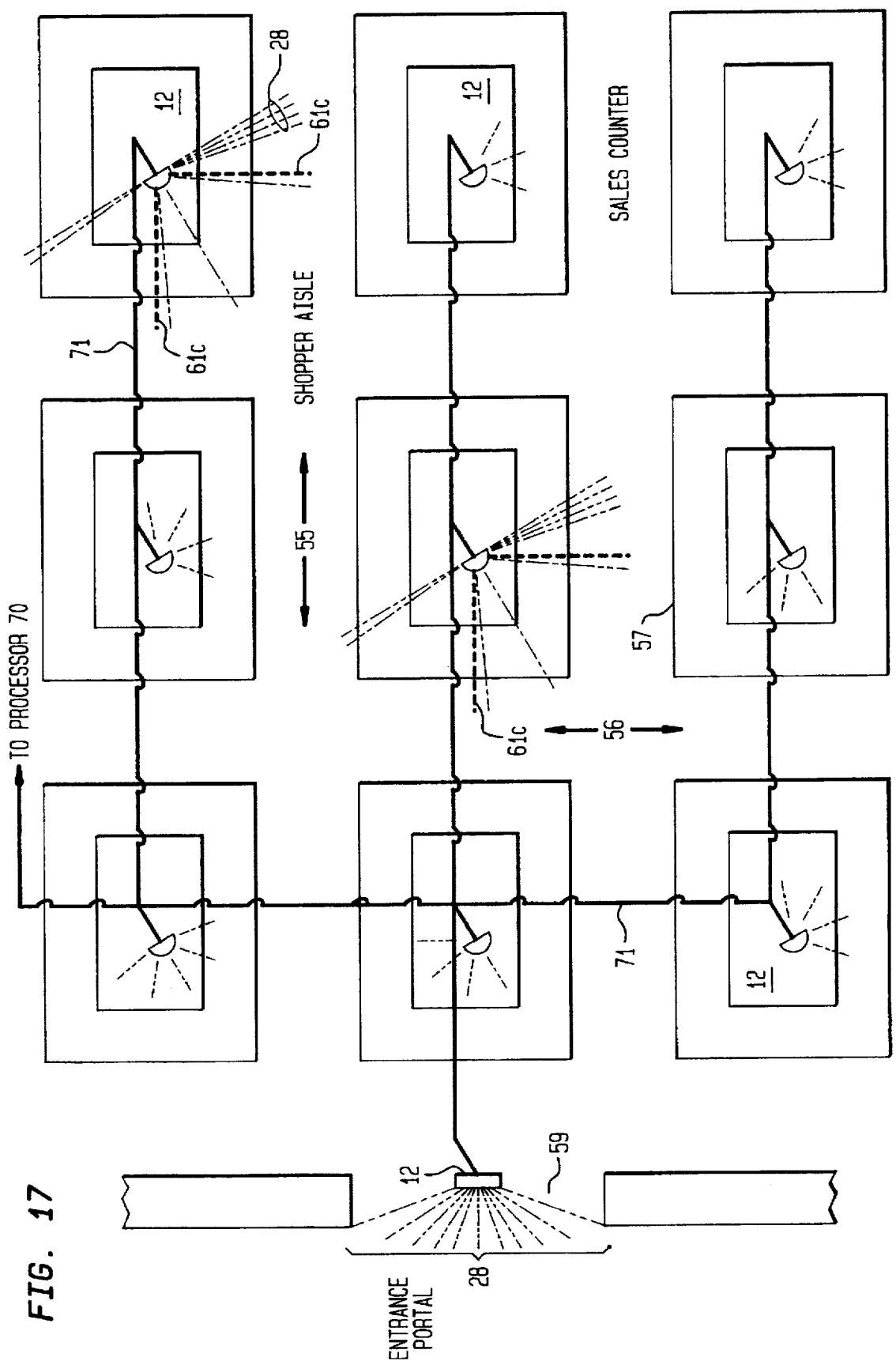
FIG. 17 is a top view sketch of retail space employing the invention.

The units 12 may be placed at aisle intersections 55–56; or as in FIG. 17 may be disposed centrally above each of several sales counters 57. Separate units 12 are placed above area access portals 59.

Advantageously, each unit 12 is dedicated to surveying a predetermined area of floor space within the total area scanned by a given unit 12, as illustrated by the oval traced by the horizontal beam set 54 in FIG. 16, so that detected movement may be mapped using a time series of spatial maps to a particular floor location such as an area of an aisle or a particular entry portal. Further, as in the ATM application it is useful to generate a "template" of the return echo within the purview of each transducer to record the quiescent state of all particular space. Likewise, as in the ATM application it is useful although not necessary to generate a spatial reference map based only on return echo signals from said fixed structures, and then compose each data frame with fixed structure return echo signals removed.

Figure 18:
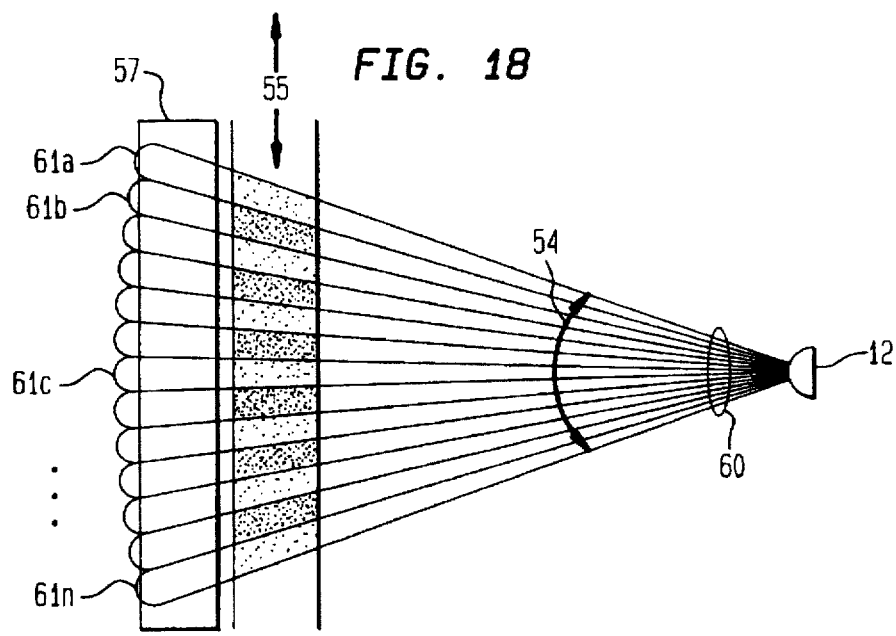
FIG. 18 is a top view sketch showing an array of horizontal acoustic beams splayed onto a shopping aisle.

The two acoustic units 12 of FIG. 16 each subtend a horizontal surveillance field 54 of sufficient beam width to cover shopper movement in areas such as aisle 55. As shown in FIG. 18, the array of unit 12 may consist of 13 acoustic beams denoted 61a . . . 61n, the actual number being a designer's choice depending on the aisle length, need for precision and other factors.

As in the ATM application, the microphone-transducer array may be constructed as illustrated and described with respect to FIG. 3, with 3 degrees of horizontal angular separation between adjacent transducers 21.

Figure 24:
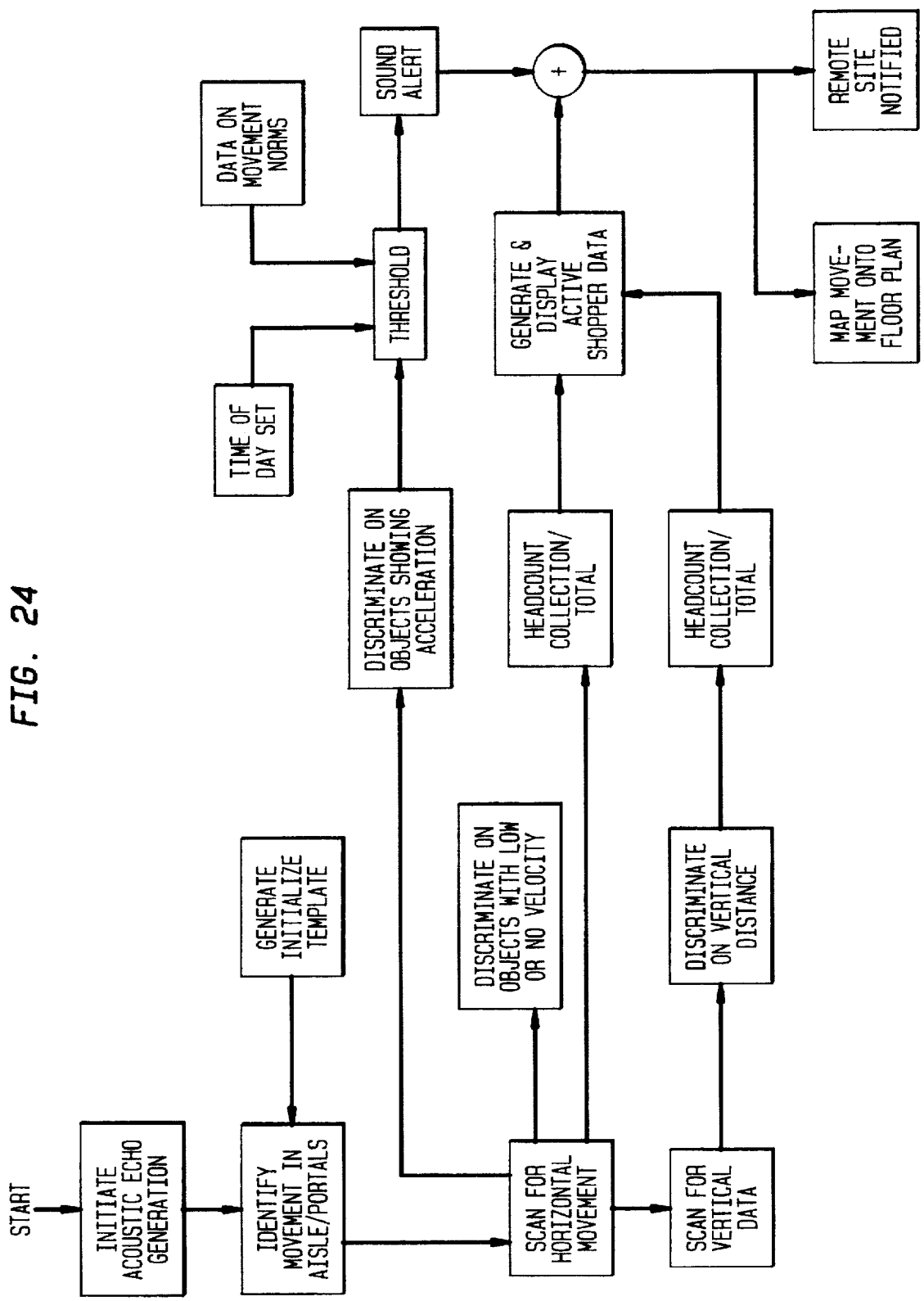
FIG. 24 is a flow chart illustrating information and signal processing sequences performed automatically to monitor traffic flow and events in retail space.

The repeated out-pulsing of acoustic signals followed by listening for acoustic echoes from objects—here, echoes from "objects" which are individual body masses of shoppers—is accomplished by apparatus and signal processing methods essentially of the same type as already described for the ATM application. The use in shopping malls and sales floors of multiple active sonar units at the same time in the same enclosure requires adjusting of the acoustic beam "ping" amplitude in the units 12 and ping synchronization as between adjacent units 12 to avoid interference. Additionally, data abstraction strategies for mall and department store surveillance and traffic monitoring are specific and somewhat different from ATM surveillance. These adaptations are described below in connection with FIGS. 23 and 24.

Generally, for developing headcounts, it is useful to update data frames every 0.1 seconds. An optimum design contemplates a maximum speed of shoppers of 5 ft/sec. A system spatial resolution of about 0.5 ft. is optimal. System sample rate of 2 kHz will provide a radial resolution of 0.5 ft using 2 samples per cell. Acoustic beam width varies according to distance. Beams should be designed with a vertical resolution of 0.5 ft to determine height to within plus/minus 3 inches; and with a horizontal resolution of 0.75 ft to reasonably identify individual shoppers.

Following are several specific examples of the utility of the invention applied to mall shopper traffic.

Vertical Object Measurements

Figure 19:
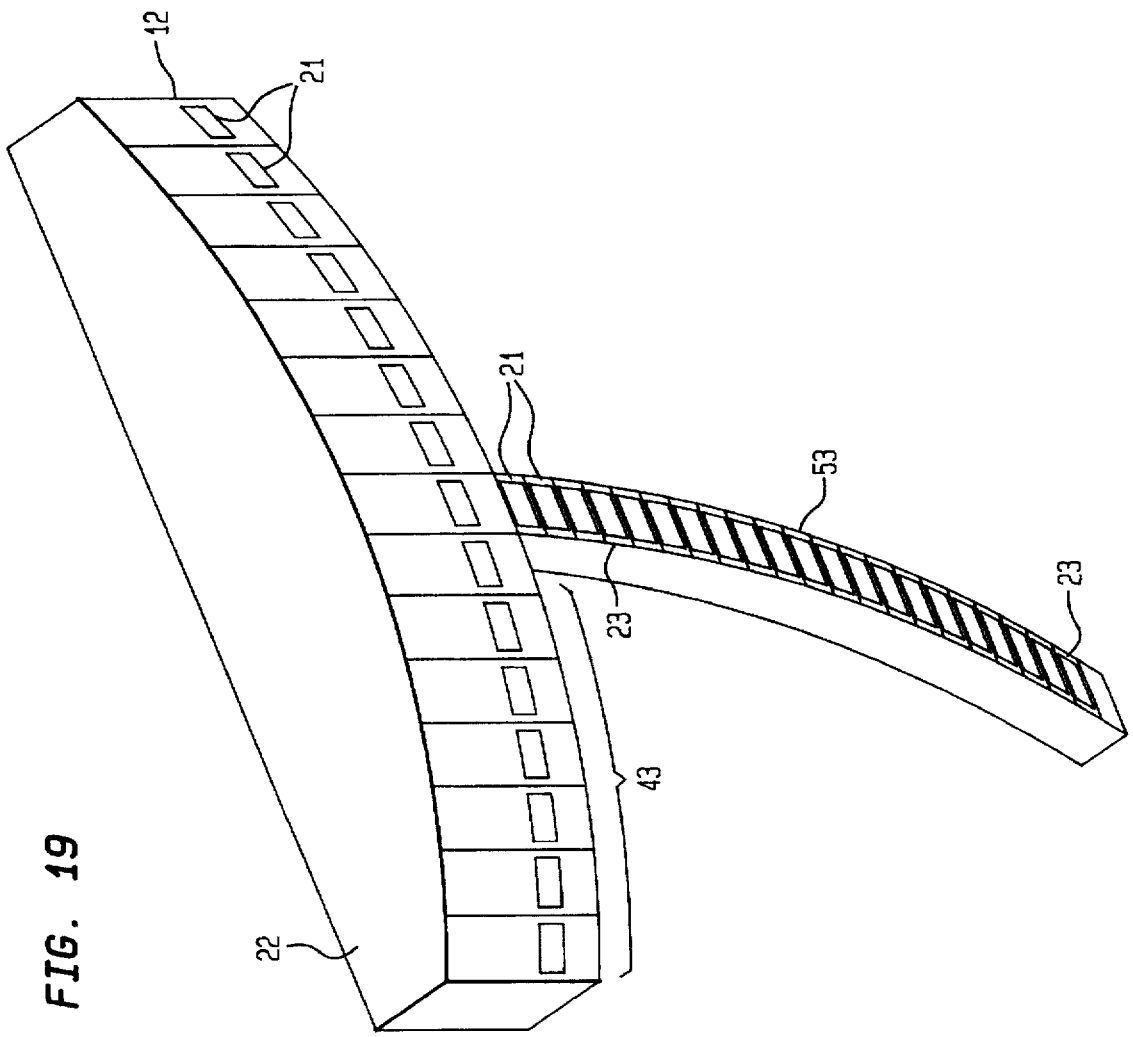
FIG. 19 is a schematic perspective diagram of a mounting element for horizontal and vertical orienting of acoustic transducers.

Mall operators are interested in knowing how many active shoppers are in attendance currently and over time. Automated traffic counting schemes therefore need a strategy for avoiding counting young children who of course do not make purchasing decisions. Vertical discrimination capability may be provided by adding to the horizontal array 43 of transducers 21 such as depicted in FIG. 3, a vertical array of, for example, 25 additional transducers 21. A vertical arrangement is illustrated in FIG. 19 which shows a vertical array 53 of further transducers 21. Each transducer 21 of the vertical array is mounted on a separate flat surface 23, each of the latter being separated in vertical aspect by about 3 degrees. A vertical transducer array 53 need be associated with only one of the horizontal beams of each unit 12, such as center beam 61c as seen in FIG. 18. The vertical beams are designed with a relatively narrow horizontal aperture of, for example, 5 degrees.

Figure 20:
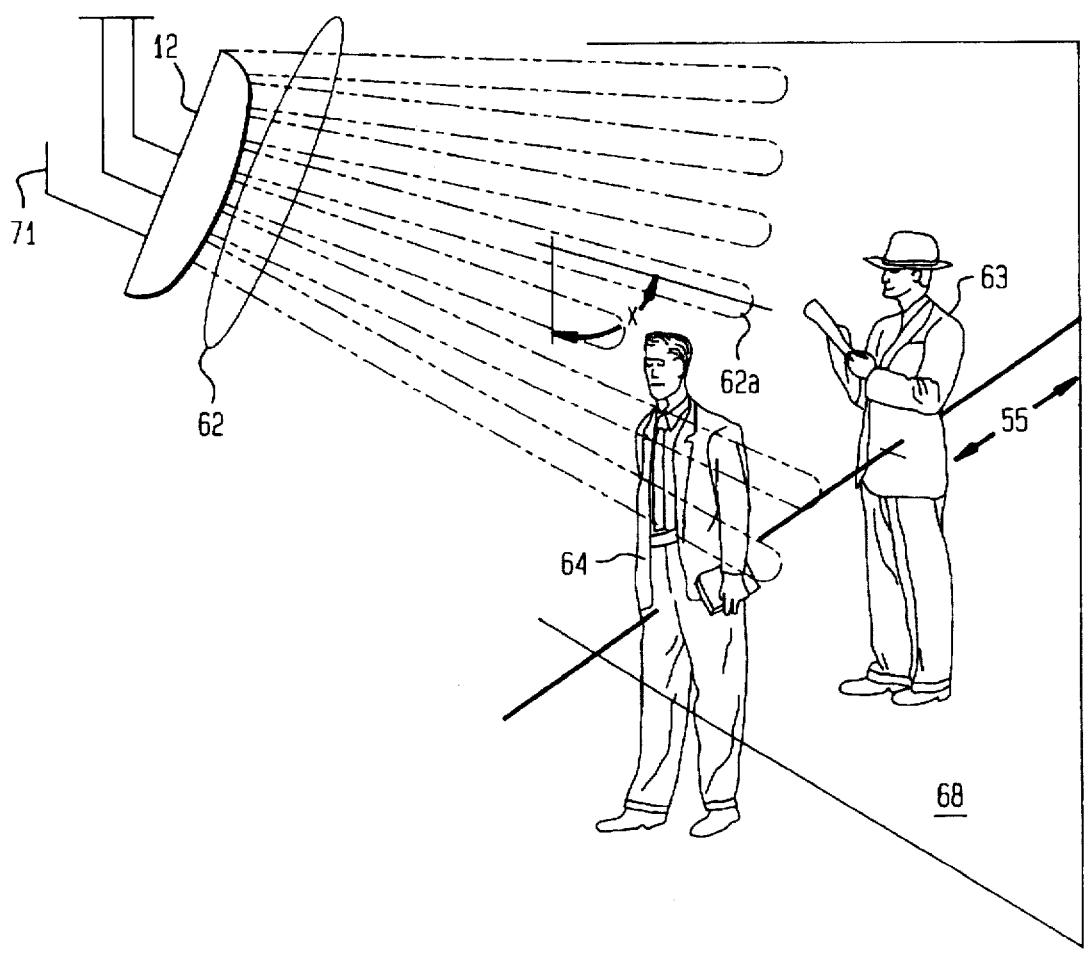
FIG. 20 is a sketch illustrating the use of a vertical acoustic beam array for discriminating on the height of passing shoppers.

Height is measured using vertical beams by taking into account the angle X, in FIG. 20 with respect to the vertical of a particular beam 62a; and by measuring the time delay between ping launch and echo received in beam 62a. Height measurements may be refined by comparing amplitudes of echo return pulses in adjacent vertical beams of the field 62. Also, ambiguities such as one shopper being shaded or blocked by another, may be resolved using statistical models developed from empirical data.

The aggregate of vertical beams, designated 62, is shown in FIG. 20. The vertical array may consist of 25 beams which are focused in a plane 68 that is perpendicular to the plane of the aisle it monitors. The plane 68 also is oriented roughly normally to the direction of shopper traffic flow in the aisles 55, 56, etc. as seen also in FIG. 17. This expedient assures sonar images of shoppers which most readily reveal differences in shopper height, from which estimates of number of children present may be made.

It is seen by reference to FIG. 20 that the child figure 64 intersects fewer of beams in the vertical array 62 than does the adult figure 63 as the pair passes through plane 68. The passing through the vertical array of an object which is detected by only a certain number of the lowermost beams is taken as an indication of a child and not of an adult shopper. By calibrating each vertical beam array to actual adult and child traffic passing by a selected entry point, a threshold value may be established. The identity of the last microphone in the vertical array to receive a return echo may be compared to the threshold; and a determination may be made of whether the moving human was a child. From an aggregate of such determinations, an estimate may be made of the number of non-shopper children present; and this estimate may be subtracted from the total shopper count to provide an indication of the number of actual money-spending shoppers in attendance. Advantageously, the latter data is captured by processor 70 in FIG. 10 and recorded for current or later use in data base 150.

Monitoring of "Staged" Events

Sales managers are interested in gauging shopper participation in numerous staged "events" such as a sale or a display at a particular counter station 58 as seen in FIG. 16. Discrimination of object movement based on certain degrees of shopper traffic slowdown or stoppage may be taken as indication of shopper interest in an "event". In accordance with this aspect of the invention, detection of traffic showdown or stoppage at counter station 58 of FIG. 16 where a sale or presentation is occurring, is afforded by repeated pulsing of the horizontal beams comprising the beam field 54 seen in FIGS. 16 and 18. Return echoes of the same object in a particular one of the horizontal fields 60 comprising beams 61a ... 61n covering the floor area in front of station 58 over consecutive pulse cycles, may be taken as revealing shopper traffic slowdown or movement stoppage, or queueing. Comparing of the data on object movement in front of station 58 to current human movement at adjoining stations, or to actual threshold data on movement slowdown or stoppage known to be caused by shopper interest in a display, is taken as indication of shopper interest in the "event"; and hence evidence of the event's success. The data may include time, place, duration and numbers of participating people. Again, the latter data may be captured by processor 70 in FIG. 10 and recorded for current or later use in data base 150.

Shopper Headcount

Data on the total number of shoppers on-premises as a function of time may be obtained using the invention by direct measurement of shopper traffic flow at entry/exit portals throughout the mall or store. The acoustic sonar units 12 shown in FIGS. 16 and 17 mounted above a portal 59 may use horizontally-directed beam forms as in FIG. 18 to detect object movement. Traffic at a portal is either entering or exiting the mall area, as depicted by the footprint flows 65 and 66 of FIG. 22. Since the beams readily discriminate between objects moving in a "north" vs. "south" direction across the horizontally splayed beams, and since further substantially all movement through portals is that of shoppers, the portal traffic data when appropriately processed provides several useful measures, including: total daily traffic; shoppers on-premises at any time; building occupancy as function of maximum permitted under fire regulations; and, roughly, residual shoppers present at day's end, given the total number entered minus the number so-far departed.

Although one unit 12 per portal generating horizontal beams may suffice, a potentially more accurate arrangement for measuring direction of movement through an access portal is provided by using two microphone arrays per portal, staggered on opposite sides of the entry walls as seen in FIGS. 21 and 22, and pulsing vertical beam arrays only. The vertical beam arrays of acoustic units 21a, 12b are illustrated in FIG. 20 by the vertical field 62; these cover two separate parallel vertical planes 69a, 69b which are physically displaced and acoustically pulsed in separate time slots sufficient to avoid mutual interference. A count of objects (shoppers) passing through plane 69a is maintained separately from the count passing through plane 69b. The two sums may be compared periodically in processor 70, for example, every minute; and average values or maximum values used to generate the shopper traffic figures.

The data on shopper height obtainable from the vertical beams (to rule out children) may be most advantageously generated at the portals, because traffic there is concentrated, tends to move continuously either in or out, moves at fairly constant velocities, and comprises the totality of incoming traffic. All of these factors make possible fairly accurate measures, based on object height discrimination, of the actual number of money-spending shoppers in the premises at any selected time.

The invention may also be applied generally to correlate purchases occurring on the sales floor with movement within the store. It also is possible to correlate the contents or the placement of goods on shelves with customer interest; and further, correlate the degree of interest in a display shown by children, with contemporaneous purchases by adults.

Shopper Queues

Stationary lines of shoppers at, for example, a portal 59 or a counter station 58 may be detected by identifying a spatial line of several objects which do not move with respect to each other, with some movement into and out of the field of the queue. A detected queue-up may connote an unduly long wait at a register, for example; and in response, assistance may be dispatched.

Detecting Disturbances or Emergencies During Open Hours

Store management also is interested during shopping hours in immediate indicators of occurrences such as unruliness, overcrowding, pilferage, etc. that may be signaled by sudden individual or mass movement, or changes movement velocity, in portions of the store. In accordance with the invention, discrimination of movement based on abnormal shopper traffic speedup may be taken as indication of an "unstaged" event requiring appropriate response.

Detecting certain forms of abnormal shopper movement indicating a potential adverse occurrence, requires a knowledge of normal store traffic patterns. Information on normal flows and densities may be readily gathered by the invention. Thus, on any given day, or over time, shopper traffic movement norms for a store exist and can be measured for all portions of the selling floor under surveillance using the present invention. For a given aisle intersection, data on traffic flow over the current day may be collected; and similarly, historical data on traffic flow velocities and density for the particular aisle intersection may be collected. These data are generated and then used to continuously compare with instantaneous traffic flow velocity or flow density data. Experiential data may also be generated on the instantaneous velocities of, for example, one or a few persons running for medical aid, or running from a perceived danger, or running in the commission of a theft. Data on crowds that in real emergency situations suddenly move en masse at an increased velocity, may also be generated.

As will be explained below in connection with FIG. 23, the invention automatically compares instantaneous measured velocities of object movement to data in the data bank of experiential normal movement data; and enables early warning alarms to be registered signifying possible disturbances or other unusual situations requiring appropriate response.

Shoplifting

Frequently shoplifters follow a movement pattern characterized by a non-stop exiting of the premises following a theft, using the prevailing crowd velocity as cover; or sometimes by an accelerated exiting if the perpetrator suspects detection of the theft. In accordance with the invention, this pattern of object movement—direct non-stop exiting or accelerated velocity—may be detected by appropriate processing in processor 70 of the moving object data; and a suspected theft alert can be displayed including the escape route being taken.

After-Hours Pilfering or Burglary

The invention is easily adapted to augmenting the normal store security following closing. The quiescent state of return echoes, taken on-site with no human movement is taken as a baseline. Then, since after-hour movement on the retail floor typically is limited to scheduled cleaning activity and security guard patrol at designated times and locations, these movements can be filtered out. The detection of any other movement based on comparisons to the quiescent state therefore is taken as a suspected burglary in process.

On detection of unexpected movement by processor 70, a priority alert is registered and its location shown by reference to a floor plan displayed by an alert video monitor (not shown). The person causing the movement may be directed over a loudspeaker to proceed to a photo-ID reading device placed on the floor (not shown); and if the photo-ID matches the alert may be discontinued. If the person does not so proceed, the alert is continued and the person's physical movement in the area is tracked by the acoustic systems of the invention.

Apparatus for Practicing the Invention

Figure 14:
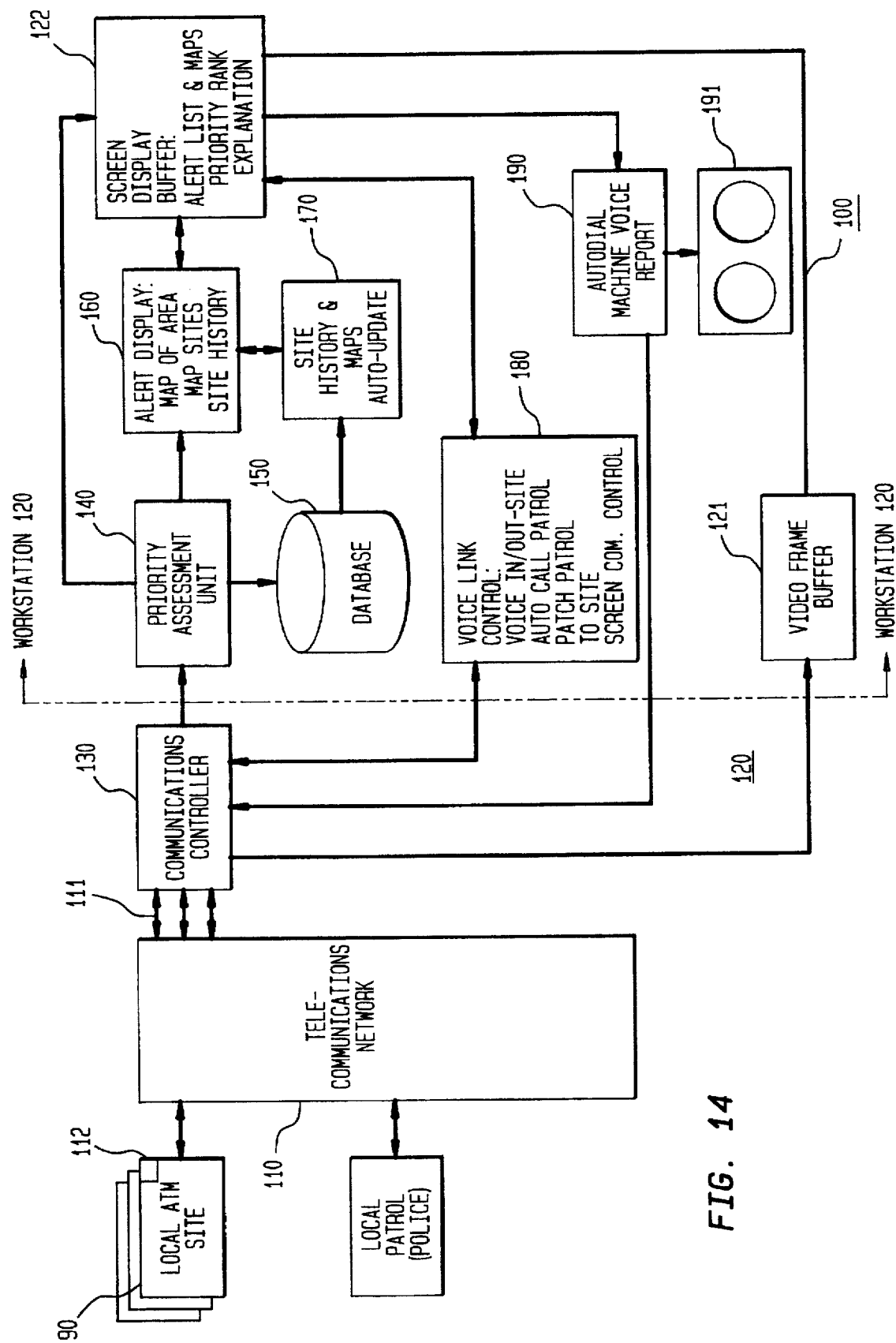
FIG. 14 is a high level functional block diagram of a full system for practicing the invention, including details of the attendant workstation data flow and display architecture.

The apparatus needed for this capability is shown in FIG. 23, and may be modeled after that shown in FIG. 14. The sonar apparatus displayed in FIG. 10, which receives and performs signal processing on return echoes, is denoted as processor 70 in FIG. 23. Processor 70 is connected to the multiple active sonar units 12 by buss 71 seen in FIGS. 17 and 23. The spatial processor 51 portion of processor 70 operate respectively to form for each frame a 2-dimensional image of objects in the beam area covered by each microphone/transducer 21. The image data differentiates each moving object in view enabling a shopper "headcount" to be made. The image data may also include for each object: relative direction of movement with respect to an aisle or a portal; and distance of each object from the transmit/receive apparatus from the units 12. These data are fed to information processor 52 which converts the data of the image samples to indicia of location, object velocity, object height, and other measures. Referring still to FIG. 23, a data base 150 contains historical or empirical data on crowd movement that is situational, i.e., abnormal in velocity, etc. This data is combined with current data on object velocity generated in processor 70 at priority assessment unit 140.

Because of the sheer size of modern mall floor space and the typical mall shopper volume, it is possible that several disturbance alerts may occur simultaneously. The system may therefore be programmed to prioritize concurrent disturbance alerts in accordance with a predetermined scheme of relative significance, which draws on data base 150 experiential data to give top ranking, for example, to a sudden detection of velocity change for all objects within the purview of any unit 12. The prioritizing program is carried out in priority assessment unit 140, the output of which drives alert display 160 to show a floor plan of the disturbance area(s). Screen display buffer 122 serves the same function as in the ATM application by showing a current alert list.

As in the ATM use, alerts and other current data on object movement may be forwarded via a telecommunications network 110 to a remote monitor site 100, as also shown in FIG. 23. Current data may also be stored for follow-up analysis.

Data Abstraction

Persons skilled in the art of acoustic signal processing will readily recognize a large variety of processing options using the acoustic echo signals developed by the present invention. An exemplary signal processing flow chart containing the major processing steps alluded to above, is found in FIG. 24. The flow chart provides steps for scanning on horizontal and vertical motion separately; and on discriminating on objects with low or no apparent velocity; on objects with suddenly increased velocity; and on vertical object height.

What is claimed is:

1. For a defined spatial zone having fixed structures and a pattern of normal human movement, apparatus for identifying said human movement and deriving therefrom traffic flow indicia, said apparatus comprising:

means for transmitting periodic bursts of acoustic energy from one or more sites in said zone to generate return echoes from said fixed structures and from individual humans in movement;

an array of horizontally oriented directional microphones at selected ones of said sites and an array of vertically oriented directional microphones mounted at selected ones of said sites, the adjacent microphones of each said array being disposed at successive incremental horizontal or vertical angles, thereby to create at each site a plurality of adjacent horizontal and/or vertical beams of return echoes from discrete horizontal or vertical sectors of said spatial zone;

a data base comprising:

means for storing data frames representing a time series of spatial maps generated from said return echoes of objects, each said map containing indicia of said moving humans, including data on the distance and relative direction from said transmitting means for each said object; and means for comparing said maps of successive said data frames to determine the total number of humans and the changes in the spatial location of said moving humans within said spatial zone.

2. Apparatus in accordance with claim 1, wherein said defined spatial zone comprises a shopping area including access portals to an interior space comprising sales counters located along shopper aisles.

3. Apparatus in acccordance with claim 2, further comprising:

means for deriving from said return echoes received by each said vertically arrayed microphone a unique indicia of vertical height of individual moving humans causing said return echoes; and means for comparing said height indicia to a preselected threshold value, those indicia falling below said threshold being deemed to be children and those indicia at or above said threshold being deemed to be adults.

4. Apparatus in accordance with claim 3, further comprising means for determining, for a given set of return echoes from a moving human received by an array of said vertically oriented directional microphones, which microphone of said array is the last to receive a said return echo, and means for recording in said data base the unique vertical height value associated with said last microphone, said value being taken as the height of the moving human within said vertical beam.

5. Apparatus in accordance with claim 4, further comprising:

means for locating two or more of said vertical beams of return echoes in adjacent relation at a selected place along one of said aisles;

means for comparing the relative amplitudes of the return echoes received by corresponding ones of said microphones for adjacent ones of said vertical beams of return echoes; and means for deriving from said comparison an indicia of the vertical height of a human moving through said acoustic energy bursts at said selected place.

6. Apparatus in accordance with claim 3, further comprising:

means for locating two or more of said vertical beams of return echoes in adjacent relation across several or all of said access portals;

means for determining the relative vertical height of individual humans causing said vertical beams of return echoes;

means for accessing data derived from said two or more vertical beams of return echoes to determine the direction of movement of said moving humans through said access portal; and means for deriving from said last two-named means a running indicia of how many adult shoppers and non-shopping children at any one time are within said shopping area.

7. Apparatus in accordance with claim 3, further comprising:

means for deriving, from information on said changes in the spatial location of said moving humans at a selected said sales counter of said spatial zone, indicia of human traffic slowdown or stoppage at said counter; and means for recording one or more of the parameters of time, place and duration of said traffic slowdown or stoppage.

8. Apparatus in accordance with claim 3, wherein said data base further comprises data collected as to normal shopper traffic flow rates and density as a function of time of day and location; and wherein said apparatus further comprises:

means for comparing either or both instantaneous traffic flow velocity and traffic density measures at one or more selected places to said normal data; and means, including predetermined threshold values representative of non-normal traffic flow rates or density for determining when said instantaneous measures exceed said normal traffic flow rates or density, for signaling an alert.

9. Apparatus in accordance with claim 3, wherein said data base further comprises:

data representative of the quiescent state of said shopping area including its said aisles during after-hours when no customers are present;

means for detecting return echoes denoting movement within said shopping area during after-hours;

and means responsive to detecting of said return echoes for signaling an alert.

10. Apparatus in accordance with claim 9, further comprising means for disabling portions of said spatial map covering areas where after-hours movement is authorized to take place, thereby to avoid triggering said alert due to detection of authorized movement.

11. Apparatus in accordance with claim 1, further comprising means for generating a spatial reference map based only on return echo signals from said fixed structures, and means for composing each said data frame with said fixed structure return echo signals removed.

* * * * *